(12) United States Patent
Ito

(10) Patent No.: US 8,421,904 B2
(45) Date of Patent: Apr. 16, 2013

(54) LENS APPARATUS AND IMAGE PICKUP APPARATUS

(75) Inventor: Daisuke Ito, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 77 days.

(21) Appl. No.: 13/209,642

(22) Filed: Aug. 15, 2011

(65) Prior Publication Data

US 2012/0044388 A1    Feb. 23, 2012

(30) Foreign Application Priority Data

Aug. 20, 2010   (JP) ................. 2010-185184

(51) Int. Cl.
 *H04N 5/225*  (2006.01)
 *G02B 9/08*  (2006.01)
 *G02B 15/14*  (2006.01)

(52) U.S. Cl.
 USPC ..................... 348/340; 359/740; 359/676

(58) Field of Classification Search ............... 348/240.3, 348/340; 359/676, 683, 685, 739, 740
 See application file for complete search history.

(56) References Cited

U.S. PATENT DOCUMENTS 5,313,330 A * 5/1994 Betensky ............. 359/676

FOREIGN PATENT DOCUMENTS

| JP | 07-151972 A | 6/1995 |
| JP | 2004-053633 A | 2/2004 |
| JP | 2004-258516 A | 9/2004 |

* cited by examiner

*Primary Examiner* — David N Spector
(74) *Attorney, Agent, or Firm* — Rossi, Kimms & McDowell LLP

(57) ABSTRACT

The lens apparatus includes an aperture stop (SP) forming an aperture, a first lens (A or B) disposed on a first side further than the aperture stop, the first side being one of an object side and an image side, and a second lens (B or A) disposed on a second side further than the aperture stop, the second side being the other of the object side and the image side. In zooming or focusing, the aperture stop is moved independently of the first and second lenses. The first lens and the aperture stop are brought into a first state where an aperture stop side lens surface of the first lens is located away from the aperture stop on the first side and a second state where at least part of the aperture stop side lens surface (RA or RB) of the first lens protrudes through the aperture to the second side further than the aperture stop.

10 Claims, 14 Drawing Sheets

LENS APPARATUS AND IMAGE PICKUP APPARATUS

BACKGROUND OF THE INVENTION

1. Field of the Invention

The present invention relates to a lens apparatus in which at least one lens and an aperture stop are moved in an optical axis direction in zooming or focusing, and to an image pickup apparatus provided with the lens apparatus.

2. Description of the Related Art

Image pickup apparatuses such as video cameras or digital still cameras require a lens apparatus capable of achieving a higher zoom magnification and performing focusing on an object at a closer distance while being small in size. As a method for realizing such a lens apparatus, decreasing a minimum distance between lenses that are adjacent to each other in the optical axis direction and relatively movable in that direction is effective.

Japanese Patent Laid-Open Nos. 2004-053633, 2004-258516 and 7-151972 disclose lens apparatuses in which an aperture stop is disposed between lenses that are relatively movable. In these lens apparatuses, it is necessary to decrease a minimum distance between the lenses disposed on both sides of the aperture stop while avoiding interference of the lenses with the aperture stop.

The lens apparatus disclosed in Japanese Patent Laid-Open No. 2004-053633 disposes the aperture stop on an image side further than an object side lens surface of a second lens group (counted from the object side), and thereby decreases the minimum distance between the lenses disposed on the both sides of the aperture stop. However, in this lens apparatus, the aperture stop is moved integrally with the second lens group in zooming. This increases variation of an exit pupil in the zooming, in an image pickup apparatus in which an image sensor (image pickup element) such as a CCD sensor is disposed at an image plane, which is undesirable for the image sensor.

On the other hand, in the lens apparatus disclosed in Japanese Patent Laid-Open No. 2004-258516, the aperture stop is also moved in zooming, which enables suppression of the variation of the exit pupil. Moreover, in the lens apparatus disclosed in Japanese Patent Laid-Open No. 7-151972, the aperture stop is unmoved (fixed) in zooming.

In the lens apparatuses disclosed in Japanese Patent Laid-Open Nos. 2004-258516 and 7-151972, it is necessary to avoid interference of the aperture stop with the lens in a state where they are closest to each other. Therefore, a minimum distance between the aperture stop and the lens is increased, which makes it impossible to sufficiently decrease the minimum distance between the lenses disposed on the both sides of the aperture stop. In particular, in a case where an aperture diameter of the aperture stop is variable, a thickness of a mechanism to vary the aperture diameter further increases the minimum distance between the lenses disposed on the both sides of the aperture stop.

As in the lens apparatus disclosed in Japanese Patent Laid-Open No. 7-151972, fixing the aperture stop in zooming causes a second lens group and a third lens group, which are disposed on an image side further than the aperture stop, to perform variation of magnification. Thus, movable amounts of the second and third lens groups are limited, which makes it difficult to sufficiently correct aberration variation in zooming.

SUMMARY OF THE INVENTION

The present invention provides a lens apparatus capable of achieving a higher zoom magnification, performing focusing on an object at a closer distance while being small in size, and reducing exit pupil variation.

The present invention provides as an aspect thereof a lens apparatus including an aperture stop forming an aperture, a first lens disposed on a first side further than the aperture stop in a direction of an optical axis of the lens apparatus, the first side being one of an object side and an image side, and a second lens disposed on a second side further than the aperture stop in the direction of the optical axis, the second side being the other of the object side and the image side. In zooming or focusing, the aperture stop is moved independently of the first and second lenses in the direction of the optical axis. The first lens and the aperture stop are brought into a first state where an aperture stop side lens surface of the first lens is located away from the aperture stop on the first side and a second state where at least part of the aperture stop side lens surface of the first lens protrudes through the aperture to the second side further than the aperture stop.

The present invention provides as another aspect thereof an image pickup apparatus including the above lens apparatus and an image pickup element photoelectrically converting an optical image formed by the lens apparatus.

Further features and aspects of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Figure 12:
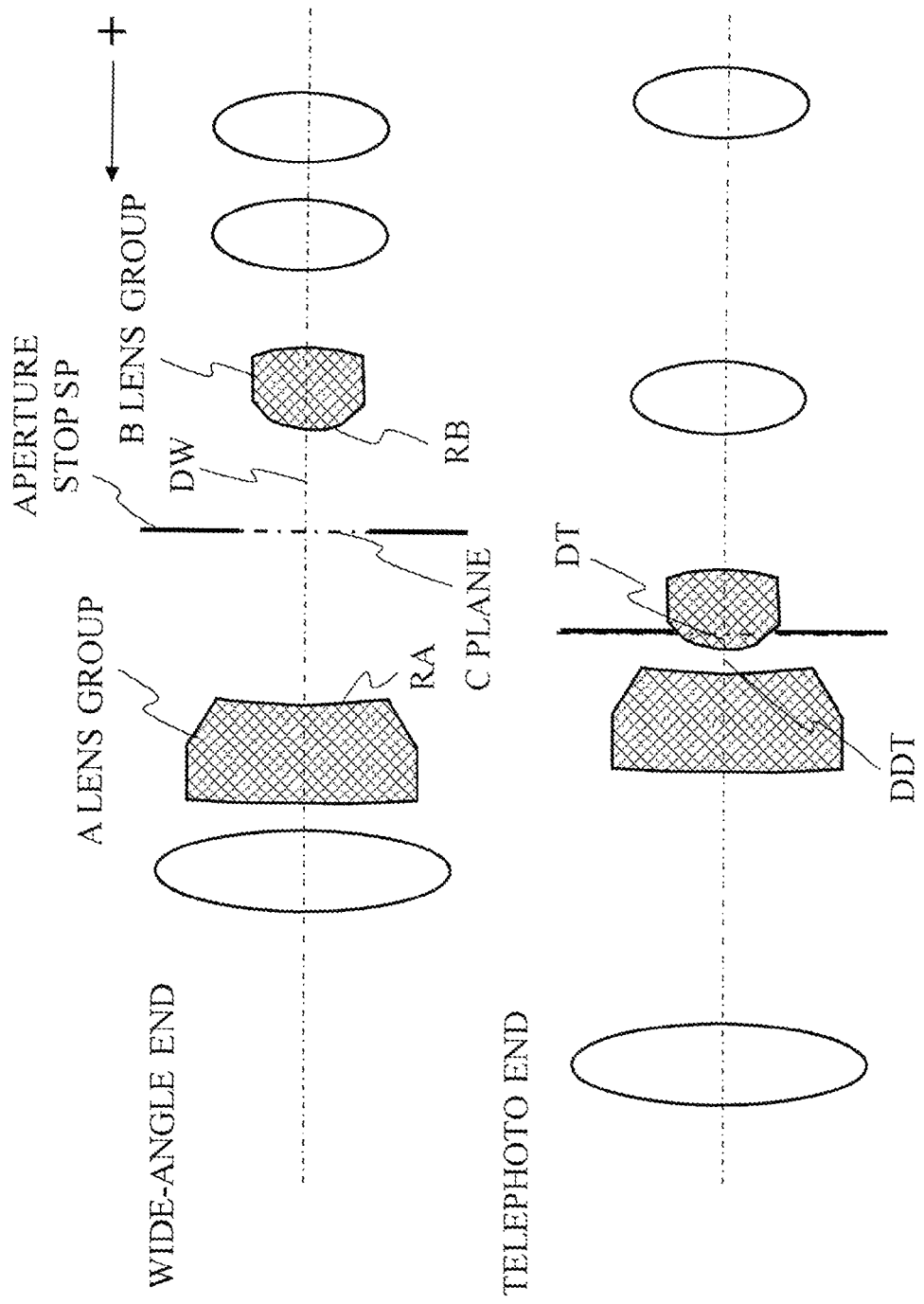
FIG. 12 shows a relationship among A and B lens groups and the aperture stop in a basic configuration of the above embodiments.

First, description will be made of a basic configuration of zoom lenses that are embodiments of the present invention with reference to FIG. 12. FIG. 12 show a zoom lens (lens apparatus) including plural lens groups arranged in order from an object side (left side in FIG. 12) to an image side (right side therein) in a direction of an optical axis of the zoom lens, and an aperture stop SP. The direction of the optical axis is hereinafter referred to as an "optical axis direction".

Among the plural lens groups shown in FIG. 12, a lens group disposed on the object side (second side) further than the aperture stop SP and closest to the aperture stop SP is referred to as an "A lens group", and a lens group disposed on the image side (first side) further than the aperture stop SP and closest to the aperture stop SP is referred to as a "B lens group". In the zoom lens shown in FIG. 12, the A lens group corresponds to a second lens, and the B lens group corresponds to a first lens.

Moreover, in the zoom lens shown in FIG. 12, in zooming between a wide-angle end (wide-angle state) and a telephoto end (telephoto state), the plural lens groups and the aperture stop SP are moved independently of each other. In zooming from the wide-angle end to the telephoto end, a distance (interval) in the optical axis direction between the A lens group and the aperture stop SP is decreased, and a distance (interval) in the optical axis direction between the aperture stop SP and the B lens group is also decreased.

The aperture stop SP forms an aperture through which light passes. A virtual plane (aperture plane) including the aperture and being orthogonal to the optical axis is referred to as a "C plane". At the wide-angle end, an object side lens surface (aperture stop side lens surface) RB of the B lens group is located away from the C plane (that is, from the aperture stop SP) on the image side. This state corresponds to a first state (one state). On the other hand, at the telephoto end, at least part of the object side lens surface RB of the B lens group protrudes through the aperture of the aperture stop SP to the object side (that is, to an A lens group side) further than the C plane. This state corresponds to a second state (another state).

More specifically, at the wide-angle end, the B lens group is located away from the aperture stop SP on the image side such that a distance in the optical axis direction from a vertex of the object side lens surface RB of the B lens group to the C plane may become DW. At the telephoto end, the B lens group comes close to the aperture stop SP to a position where the at least part of the object side lens surface RB of the B lens group protrudes through the aperture of the aperture stop SP to the object side further than the aperture stop SP (C plane) such that a distance in the optical axis direction from the vertex of the object side lens surface RB to the C plane may become DT.

The aperture stop SP is a variable aperture stop (iris diaphragm) in which a diameter of the aperture is variable. The diameter of the aperture is hereinafter referred to as an "aperture diameter". In the example of FIG. 12, the aperture diameter at the telephoto end is smaller than that at the wide-angle end. In this case, at the telephoto end, the aperture stop SP is narrowed only to a state where stop blades forming the aperture come close to or into slight contact with the object side lens surface RB of the B lens group. In other words, the aperture diameter at the telephoto end is a minimum aperture diameter of the aperture stop SP corresponding to, for example, an F-number of 11. The distance DT is set such that the stop blades forming that minimum aperture diameter may come close to or into slight contact with the object side lens surface RB of the B lens group.

When the aperture stop SP is such a variable aperture stop, since the aperture stop SP is provided with an open/close mechanism that varies the aperture diameter and has a certain amount of thickness in the optical axis direction, it is necessary to provide a space where the open/close mechanism is placed between the A lens group and the aperture stop SP at the telephoto end at which the A lens group and the aperture stop SP come closest to each other. This makes it impossible to bring the A lens group and the aperture stop SP sufficiently close to each other.

However, as shown in FIG. 12, at the telephoto end, the B lens group comes close to the aperture stop SP to the position where the at least part of the object side lens surface RB thereof protrudes to the object side further than the aperture stop SP (C plane). This enables a sufficient decrease of a distance DDT on the optical axis between the object side lens surface RB of the B lens group and an image side lens surface RA of the A lens group, the lens surfaces RB and RA being disposed on both sides of the aperture stop SP. Thus, an effect of increasing a focal length (that is, a zoom magnification) at the telephoto end and an effect of reducing an entire length of the zoom lens can be obtained.

The aperture stop SP may be a fixed aperture stop whose aperture diameter is fixed (invariable). Also in this case, the effect of increasing the zoom magnification and the effect of reducing the entire length of the zoom lens can be obtained.

As described above, the zoom lens shown in FIG. 12 is capable of decreasing the minimum distance between the A and B lens groups disposed on the both sides of the aperture stop SP.

Moreover, the aperture stop SP that is movable independently of the respective lens groups in zooming enables adjustment of the position of the aperture stop SP between the wide-angle end and the telephoto end, which makes it possible to suppress variation of an exit pupil of the zoom lens due to the zooming. Furthermore, the variable aperture diameter enables control of the aperture diameter according to brightness of an object, which makes it possible to increase a lens aperture diameter at the wide-angle end.

Figure 14:
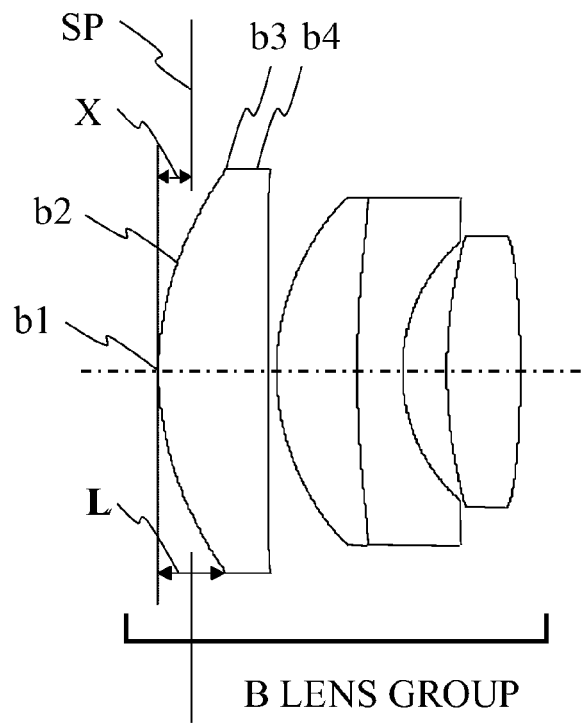
FIG. 14 shows a relationship between the B lens group and the aperture stop in the embodiment shown in FIG. 12.

Detailed description will here be made of a positional relationship in the optical axis direction between the B lens group and the aperture stop SP at the telephoto end with reference to FIG. 14. At the telephoto end, the aperture stop SP (C plane) is located between, of plural lens surfaces included in the B-lens group, an optical axis direction position of a vertex b1 of a most object side lens surface (aperture stop side lens surface, and hereinafter referred to as an "object side lens surface") b2 and an optical axis direction position of an outer edge b3 of the object side lens surface b2. The outer edge b3 is a position where the object side lens surface b2 and an edge surface (outer circumferential cylindrical surface) b4 intersect with each other.

Although the above description has been made of the case where the B lens group comes closest to the aperture stop SP at the telephoto end, the B lens group may come closest to the aperture stop SP at the wide-angle end. Moreover, although the above description has been made of the relationship between the A and B lens groups and the aperture stop SP in zooming, a same or similar relationship may be established in focusing between an infinitely far distance end (infinitely far distance in-focus state) and a close distance end (close distance in-focus state).

Figure 13:
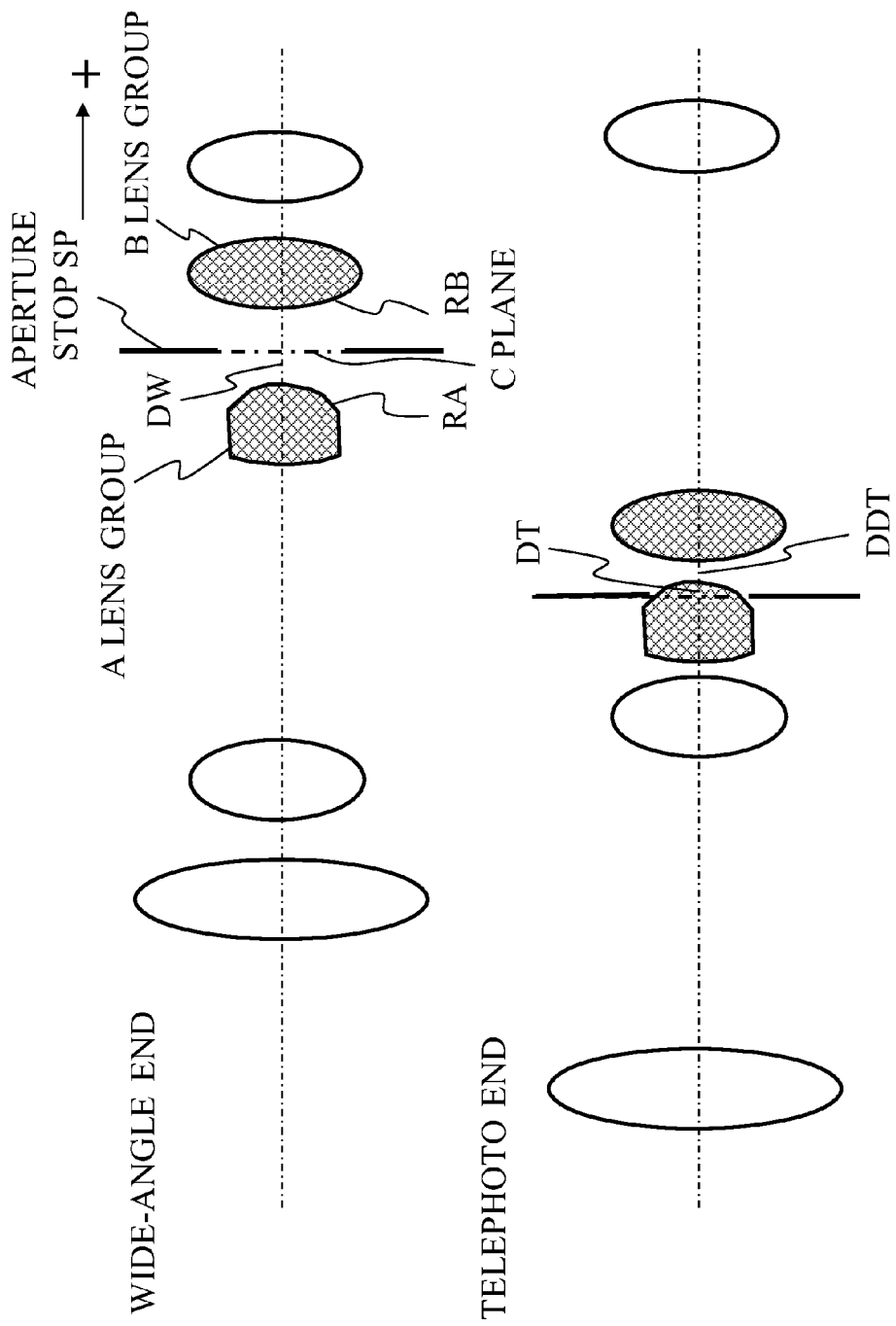
FIG. 13 shows a relationship among A and B lens groups and the aperture stop in another basic configuration of the above embodiments.

Next, description will be made of another basic configuration of zoom lenses that are embodiments of the present invention with reference to FIG. 13. FIG. 13 show a zoom lens (lens apparatus) including plural lens groups that are arranged in order from an object side (left side in FIG. 13) to an image side (right side therein) in the optical axis direction, and an aperture stop SP.

Among the plural lens groups shown in FIG. 13, a lens group disposed on the object side (first side) further than the aperture stop SP and closest to the aperture stop SP is referred to as an "A lens group", and a lens group disposed on the image side (second side) further than the aperture stop SP and closest to the aperture stop SP is referred to as a "B lens group". In the zoom lens shown in FIG. 13, the A lens group corresponds to a first lens, and the B lens group corresponds to a second lens.

Moreover, in the zoom lens shown in FIG. 13, in zooming between a wide-angle end (wide-angle state) and a telephoto end (telephoto state), the plural lens groups and the aperture stop SP are moved independently of each other. In zooming from the wide-angle end to the telephoto end, a distance (interval) in the optical axis direction between the A lens group and the aperture stop SP is decreased, and a distance (interval) in the optical axis direction between the aperture stop SP and the B lens group is also decreased.

The aperture stop SP forms an aperture through which light passes. A virtual plane (aperture plane) including the aperture and orthogonal to the optical axis is referred to as a "C plane". At the wide-angle end, an image side lens surface (aperture stop side lens surface) RA of the A lens group is located away from the C plane (that is, from the aperture stop SP) on the object side. This state corresponds to a first state (one state).

On the other hand, at the telephoto end, at least part of the image side lens surface RA of the A lens group protrudes through the aperture of the aperture stop SP to the image side (that is, to a B lens group side) further than the C plane. This state corresponds to a second state (another state).

More specifically, at the wide-angle end, the A lens group is located away from the aperture stop SP on the object side such that a distance in the optical axis direction from a vertex of the image side lens surface RA of the A lens group to the C plane may become DW. At the telephoto end, the A lens group comes close to the aperture stop SP to a position where the at least part of the image side lens surface RA of the A lens group protrudes through the aperture of the aperture stop SP to the image side further than the aperture stop SP (C plane) such that a distance in the optical axis direction from the vertex of the image side lens surface RA to the C plane may become DT.

The aperture stop SP is a variable aperture stop (iris diaphragm) in which its aperture diameter is variable. In the example of FIG. 13, the aperture diameter at the telephoto end is smaller than that at the wide-angle end. In this case, at the telephoto end, the aperture stop SP is narrowed only to a state where stop blades forming the aperture come close to or into slight contact with the image side lens surface RA of the A lens group. In other words, the aperture diameter at the telephoto end is a minimum aperture diameter of the aperture stop SP corresponding to, for example, an F-number of 11. The distance DT is set such that the stop blades forming that minimum aperture diameter may come close to or into slight contact with the image side lens surface RA of the A lens group.

When the aperture stop SP is such a variable aperture stop, since the aperture stop SP is provided with an open/close mechanism that varies the aperture diameter and has a certain amount of thickness in the optical axis direction, it is necessary to provide a space where the open/close mechanism is placed between the B lens group and the aperture stop SP at the telephoto end at which the B lens group and the aperture stop SP come closest to each other. This makes it impossible to bring the B lens group and the aperture stop SP sufficiently close to each other.

However, as shown in FIG. 13, at the telephoto end, the A lens group comes close to the aperture stop SP to the position where the at least part of the image side lens surface RA thereof protrudes to the image side further than the aperture stop SP (C plane). This enables a sufficient decrease of a distance DDT on the optical axis between an object side lens surface RB of the B lens group and the image side lens surface RA of the A lens group, the lens surfaces RB and RA being disposed on both sides of the aperture stop SP. Thus, an effect of increasing a focal length (that is, a zoom magnification) at the telephoto end and an effect of reducing an entire length of the zoom lens can be obtained.

The aperture stop SP may be a fixed aperture stop whose aperture diameter is fixed (invariable). Also in this case, the effect of increasing the zoom magnification and reducing the entire length of the zoom lens can be obtained.

As described above, the zoom lens shown in FIG. 13 is capable of decreasing the minimum distance between the A and B lens groups disposed on the both sides of the aperture stop SP.

Moreover, the aperture stop SP that is movable independently of the respective lens groups in zooming enables adjustment of the position of the aperture stop SP between the wide-angle end and the telephoto end, which makes it possible to suppress variation of an exit pupil of the zoom lens due to the zooming. Furthermore, the variable aperture diameter enables control of the aperture diameter according to brightness of an object, which makes it possible to increase a lens aperture diameter at the wide-angle end.

Figure 15:
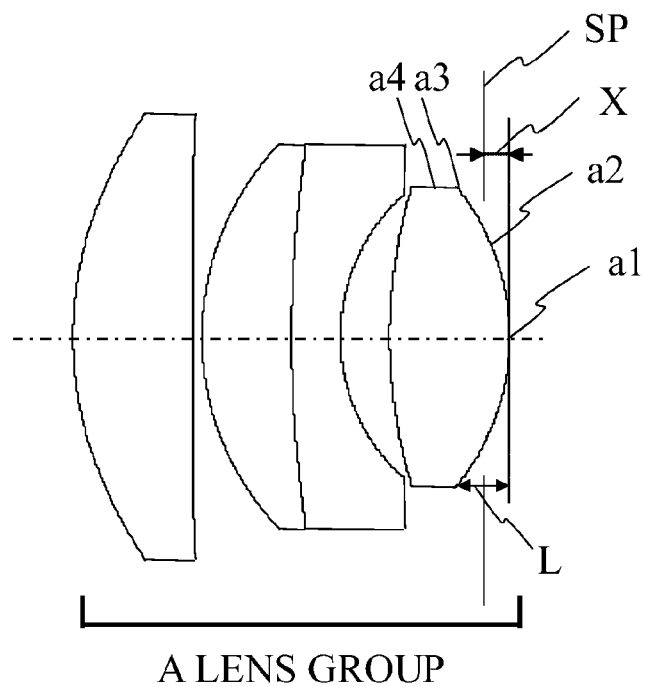
FIG. 15 shows a relationship between the A lens group and the aperture stop in the embodiment shown in FIG. 13.

Detailed description will here be made of a positional relationship in the optical axis direction between the A lens group and the aperture stop SP at the telephoto end with reference to FIG. 15. At the telephoto end, the aperture stop SP (C plane) is located between, of plural lens surfaces included in the A lens group, an optical axis direction position of a vertex a1 of a most image side lens surface (aperture stop side lens surface, and hereinafter referred to as an "image side lens surface") a2 and an optical axis direction position of an outer edge a3 of the image side lens surface a2. The outer edge a3 is a position where the image side lens surface a2 and an edge surface (outer circumferential cylindrical surface) a4 intersect with each other.

Although the above description has been made of the case where the A lens group comes closest to the aperture stop SP at the telephoto end, the A lens group may come closest to the aperture stop SP at the wide-angle end. Moreover, although the above description has been made of the relationship between the A and B lens groups and the aperture stop SP in zooming, a same or similar relationship may be established in focusing between an infinitely far distance end (infinitely far distance in-focus state) and a close distance end (close distance in-focus state).

Next, description will be made of specific embodiments of the present invention.

The following specific embodiments include a so-called negative-lead zoom lens whose most object side lens group is a negative lens group, and a so-called positive-lead zoom lens whose most object side lens group is a positive lens group.

Figure 1:
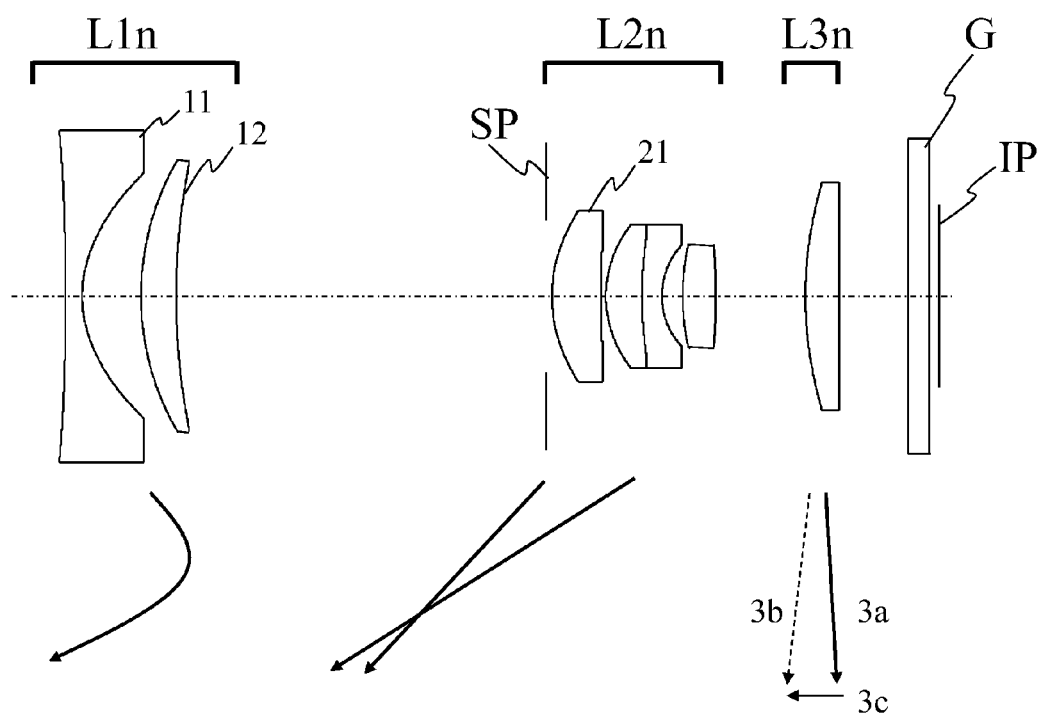
FIG. 1 is a cross-sectional view of a lens apparatus of Embodiment 1 (Numerical Example 1) of the present invention.

FIG. 1 shows the configuration of a zoom lens that is a first embodiment (Embodiment 1) of the present invention. This zoom lens is a negative-lead zoom lens.

Figure 3:
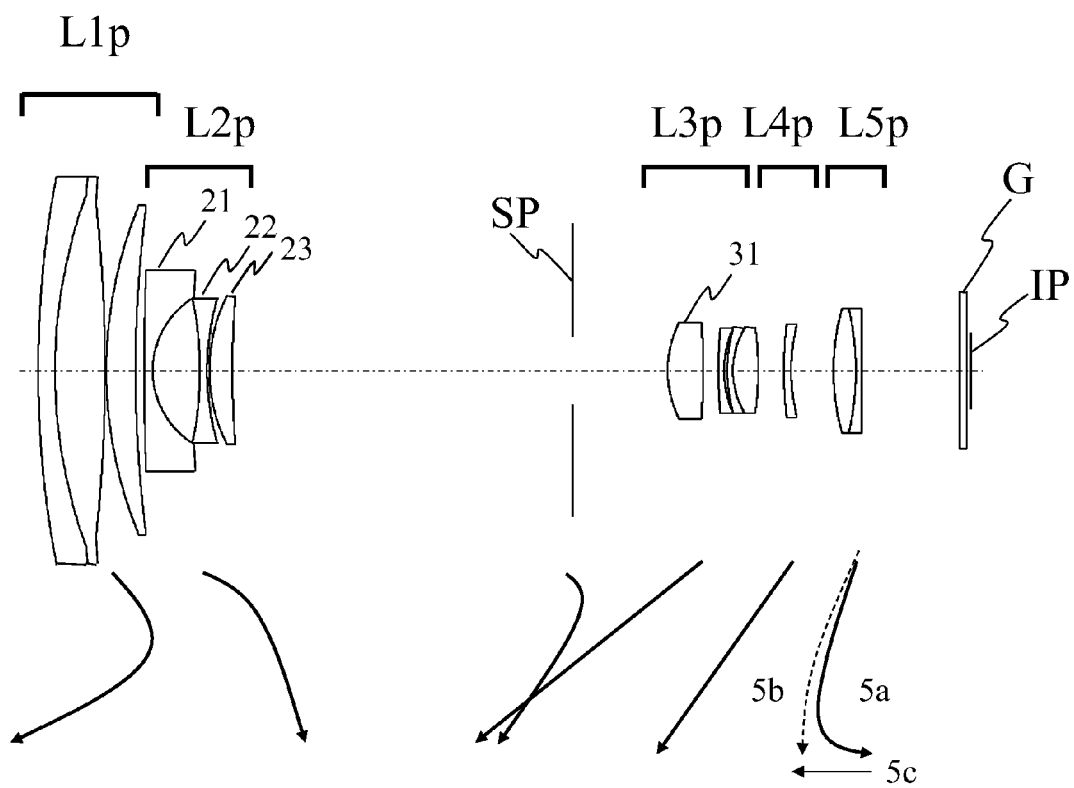
FIG. 3 is a cross-sectional view of a lens apparatus of Embodiment 2 (Numerical Example 2) of the present invention.

FIG. 3 shows the configuration of a zoom lens that is a second embodiment (Embodiment 2) of the present invention. This zoom lens is a positive-lead zoom lens.

Figure 5:
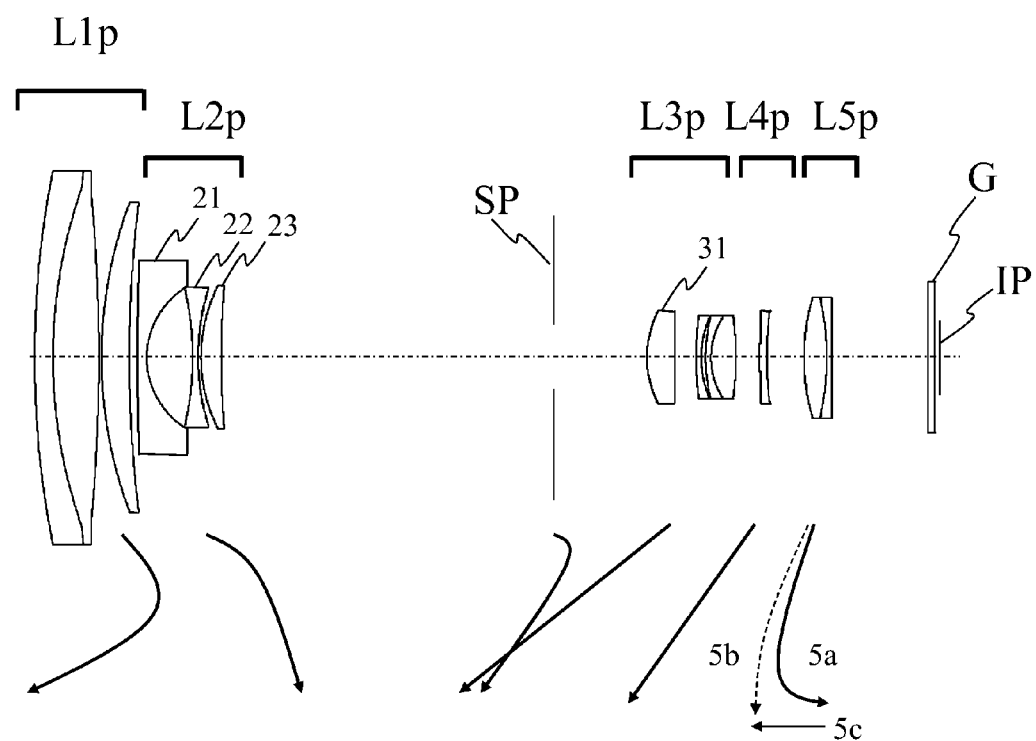
FIG. 5 is a cross-sectional view of a lens apparatus of Embodiment 3 (Numerical Example 3) of the present invention.

FIG. 5 shows the configuration of a zoom lens that is a third embodiment (Embodiment 3) of the present invention. This zoom lens is a positive-lead zoom lens.

Figure 7:
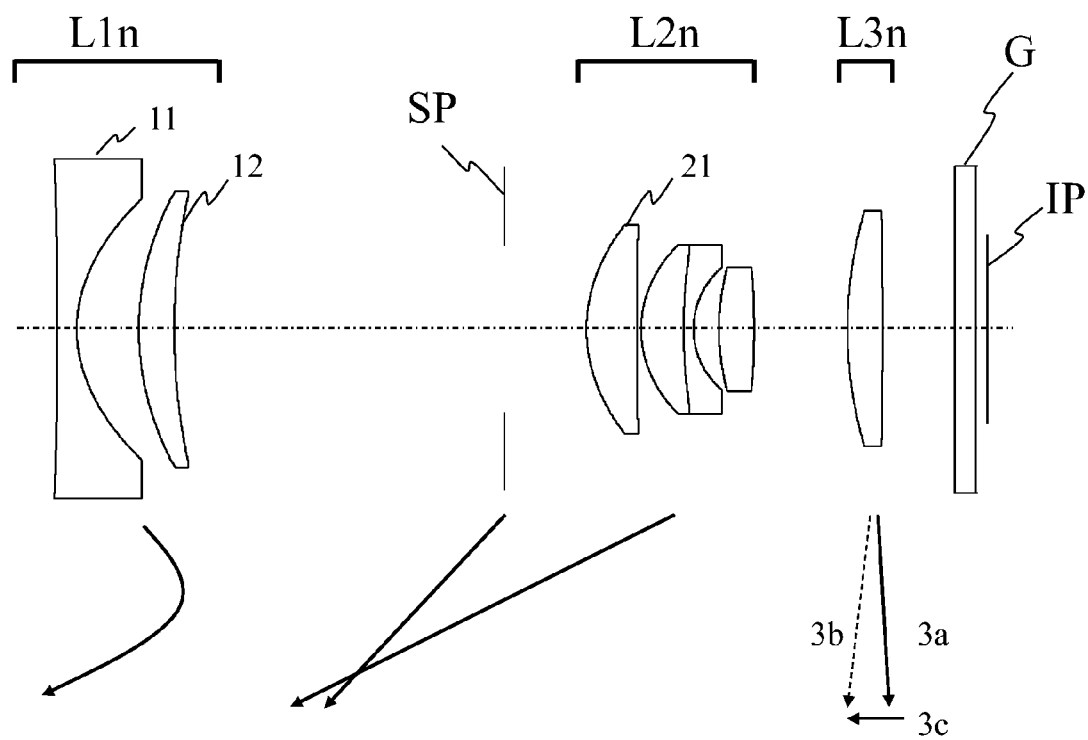
FIG. 7 is a cross-sectional view of a lens apparatus of Embodiment 4 (Numerical Example 4) of the present invention.

FIG. 7 shows the configuration of a zoom lens that is a fourth embodiment (Embodiment 4) of the present invention. This zoom lens is a negative-lead zoom lens.

Figure 9:
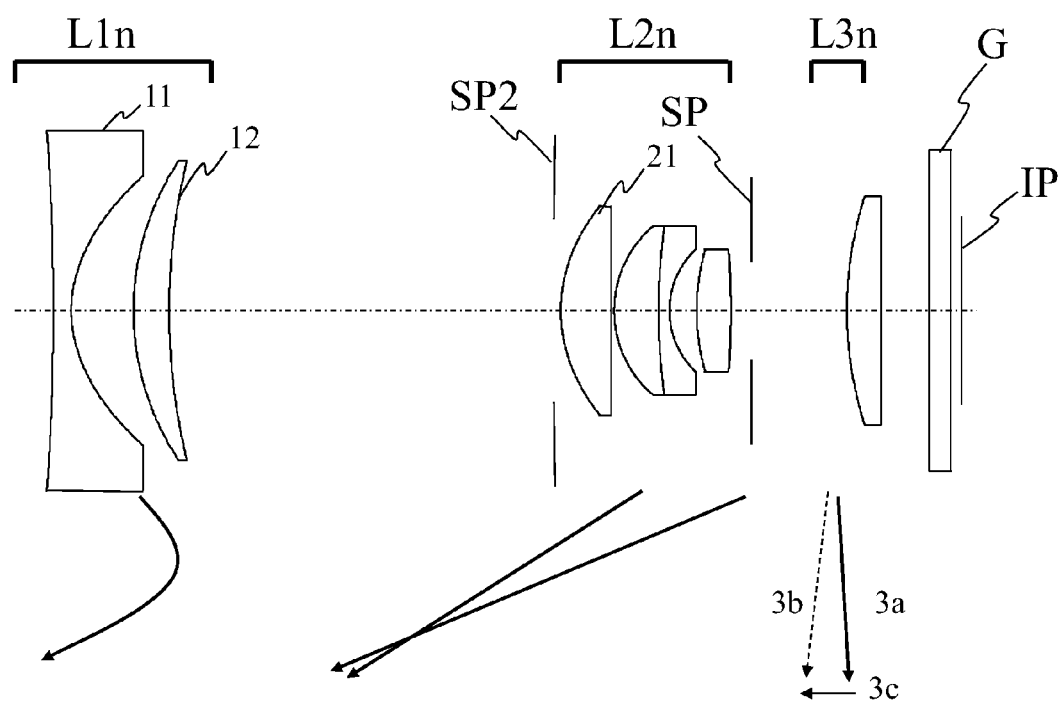
FIG. 9 is a cross-sectional view of a lens apparatus of Embodiment 5 (Numerical Example 5) of the present invention.

FIG. 9 shows the configuration of a zoom lens that is a fifth embodiment (Embodiment 5) of the present invention. This zoom lens is a negative-lead zoom lens.

[Zoom Lenses of Embodiments 1 and 4]

Each of the zoom lenses of Embodiments 1 and 4 is constituted by a lens group (second lens) L1n having a negative refractive power, an aperture stop SP, a lens group (first lens) L2n having a positive refractive power and a lens group L3n having a positive refractive power, which are arranged in order from the object side to the image side.

Reference character G denotes a glass block such as a crystal low-pass filter or an infrared cutting filter. Reference character IP denotes an image plane (image surface) at which a light-receiving surface of an image sensor (image pickup element or photoelectric conversion element), such as a CCD sensor or a CMOS sensor, is disposed in an image pickup apparatus provided with the zoom lens. The image sensor photoelectrically converts an object image (optical image) formed by the zoom lens. The glass block G and the image plane IP are also included in Embodiments 2 to 5.

In zooming from the wide-angle end to the telephoto end, the lens group L1n is once moved toward the image side and then moved toward the object side, and the aperture stop SP is moved toward the object side. The lens group L2n is moved toward the object side, and the lens group L3n is moved toward the image side.

Moreover, in the zooming from the wide-angle end to the telephoto end, a distance between the lens group L1n and the aperture stop SP is decreased, a distance between the aperture stop SP and the lens group L2n is decreased, and a distance between the lens group L2n and the lens group L3n is increased.

Each of the zoom lenses of Embodiments 1 and 4 moves the positive lens group L2n and the positive lens group L3n to perform variation of magnification. Moreover, each of the zoom lenses of Embodiments 1 and 4 reciprocates the negative lens group L1n so as to draw a movement track convex toward the image side to compensate image plane variation caused due to the variation of magnification.

In addition, each of the zoom lenses of Embodiments 1 and 4 is a rear focus zoom lens that moves the lens group L3n in the optical axis direction to perform focusing.

A solid curved line 3a and a dotted curved line 3b added to the lens group L3n in the figure respectively show movement tracks thereof for compensating the image plane variation caused due to the variation of magnification in the infinitely far distance in-focus state and in the close distance in-focus state.

Moreover, at the telephoto end, when performing focusing from an infinitely far distance side to a close distance side, each of the zoom lenses of Embodiments 1 and 4 moves the lens group L3n toward the object side as shown by an arrow 3c.

In each of the zoom lenses of Embodiments 1 and 4, the aperture stop SP is movable in the optical axis direction independently of the respective lens groups L1n, L2n and L3n in zooming. The aperture stop SP is located on the object side further than a most object side lens surface, that is, an aperture stop side lens surface of the lens group L2n at the wide-angle end, and is located on the image side further than the aperture stop side lens surface of the lens group L2n at the telephoto end. This configuration enables a sufficient decrease of a distance between the lens group L1n and the lens group L2n at the telephoto end, which can provide an effect of increasing a focal length at the telephoto end and an effect of reducing an entire length of the zoom lens.

Moreover, the aperture stop SP is located on the object side further than the aperture stop side lens surface of the lens group L2n at the wide-angle end and located on the image side further than the aperture stop side lens surface of the lens group L2n at the telephoto end, which enables suppression of positional variation of an exit pupil of the zoom lens in zooming. Especially, increasing the distance between the lens group L2n and the aperture stop SP at the wide-angle end (that is, further distancing the lens group L2n from the aperture stop SP) makes it possible to distance the exit pupil, which easily comes close to the image plane, from the image plane.

Furthermore, the increase of the distance between the lens group L2n and the aperture stop SP decreases the distance between the lens group L1n and the aperture stop SP, which is effective for reducing a diameter of the lens group L1n (so-called front lens diameter) at the wide-angle end.

In addition, the aperture diameter of the aperture stop SP is varied so as to reduce from the wide-angle end toward the telephoto end. A large aperture diameter at the wide-angle end can realize a large lens aperture diameter at the wide-angle end.

At the telephoto end, the aperture stop SP can be narrowed to a state where its stop blades come close to or into slight contact with the aperture stop side lens surface of the lens group L2n. This can provide a minimum aperture diameter corresponding to, for example, an F-number of 11. This means that the lens group L2n can be moved toward the object side to an optical axis direction position where the stop blades forming the aperture diameter corresponding to the F-number of 11 come close to or into slight contact with the aperture stop side lens surface of the lens group L2n that protrudes through the aperture of the aperture stop SP to the object side further than the aperture stop SP. This makes it possible to sufficiently decrease the distance between the lens groups L1n and L2n.

Moreover, each of the zoom lenses of Embodiments 1 and 4 has a configuration of the negative lens group L1n which causes an off-axis principal ray to propagate toward a center of the aperture of the aperture stop SP. In this case, particularly at the wide-angle end, an amount of refraction of the off-axis principal ray increases, which easily causes off-axis aberration, especially astigmatism. Thus, each of the zoom lenses of Embodiments 1 and 4 has a concave-convex configuration of the lens group L1n, which can suppress increase of the front lens diameter, as well as a normal wide-angle lens. A concave (negative) lens 11 and a convex (positive) lens 12 that constitute the lens group L1n are formed so as to have approximately concentric spherical shapes whose centers are located at the center of the aperture of the aperture stop SP in order to suppress generation of the off-axis aberration caused by the refraction of the off-axis principal ray. The concave lens 11 has an image side concave surface, and the convex lens 12 has a meniscus shape including an object side convex surface.

A most object side convex lens 21 of the lens group L2n has a convex shape toward the object side in order to prevent generation of the off-axis aberration caused by a large refraction of the off-axis principal ray emerging from the lens group L1n. It is desirable to provide such a convex shape toward the object side to the convex lens 21 in order also to reduce a generation amount of spherical aberration with respect to axial rays divergently emerging from the lens group L1n.

[Zoom Lenses of Embodiments 2 and 3]

Each of the zoom lenses of Embodiments 2 and 3 is constituted by a lens group L1p having a positive refractive power, a lens group (second lens) L2p having a negative refractive power, an aperture stop SP, a lens group (first lens) L3p having a positive refractive power, a lens group L4p having a negative refractive power and a lens group L5p having a positive refractive power, which are arranged in order from the object side to the image side.

In zooming from the wide-angle end to the telephoto end, the lens group L1p and the aperture stop SP are moved so as to draw movement tracks convex toward the image side, and the lens group L2p is moved toward the image side. The lens groups L3p and L4p are moved toward the object side, and the lens group L5p is moved so as to draw a movement track convex toward the object side. The lens group L1p may be fixed in the zooming.

Each of the zoom lenses of Embodiments 2 and 3 is a rear focus zoom lens that moves the lens group L5p in the optical axis direction to perform focusing.

A solid curved line 5a and a dotted curved line 5b added to the lens group L5p in the figure respectively show movement tracks thereof for compensating the image plane variation caused due to the variation of magnification in the infinitely far distance in-focus state and in the close distance in-focus state.

Moreover, at the telephoto end, when performing focusing from an infinitely far distance side to a close distance side, each of the zoom lenses of Embodiments 2 and 3 moves the lens group L5p toward the object side as shown by an arrow 5c.

Each of the zoom lenses of Embodiments 2 and 3 moves the lens groups L1p, L2p and L3p to perform the variation of magnification. The movement of the lens group L1p toward the object side in the zooming from the wide-angle end to the telephoto end can provide a high magnification ratio while reducing an entire lens length at the wide-angle end.

Moreover, in the zooming from the wide-angle end to the telephoto end, employing the movement track of the lens group L1p causing it to move once toward the image side and then move toward the object side can reduce an entire lens length in a middle zoom range. This makes it possible to reduce an effective diameter of the lens group L1p which is decided in the middle zoom range, thereby reducing the front lens diameter.

Moreover, moving the lens group L2p so as to be located at the telephoto end on the image side further than at the wide-angle end can provide a greater effect of the variation of magnification to the lens group L2p.

Furthermore, moving the lens group L3p so as to be located at the telephoto end on the object side further than at the wide-angle end can provide a greater effect of the variation of magnification to the lens group L3p.

In addition, moving the lens group L4p so as to be located at the telephoto end on the object side further than at the wide-angle end can provide a space where the lens group L5p that is a focus lens group is moved.

In each of the zoom lenses of Embodiments 2 and 3, the aperture stop SP is movable in the optical axis direction independently of the respective lens groups L1p to L5p in zooming. The aperture stop SP is located on the object side further than a most object side lens surface, that is, an aperture stop side lens surface of the lens group L3p at the wide-angle end, and is located on the image side further than the aperture stop side lens surface of the lens group L3p at the telephoto end. This configuration enables a sufficient decrease of the distance between the lens group L2p and the lens group L3p at the telephoto end, which can provide an effect of increasing a focal length at the telephoto end and an effect of reducing an entire length of the zoom lens.

Moreover, the aperture stop SP is located on the object side further than the aperture stop side lens surface of the lens group L3p at the wide-angle end and located on the image side further than the aperture stop side lens surface of the lens group L3p at the telephoto end, which enables suppression of positional variation of an exit pupil of the zoom lens in zooming. Especially, increasing the distance between the lens group L3p and the aperture stop SP at the wide-angle end (that is, further distancing the lens group L3p from the aperture stop SP) makes it possible to distance the exit pupil, which easily comes close to the image plane, from the image plane.

Furthermore, from the wide-angle end to the middle zoom range, bringing the lens group L1p and the aperture stop SP close to each other can reduce the front lens diameter.

In addition, the aperture diameter of the aperture stop SP is varied so as to reduce from the wide-angle end toward the telephoto end. A large aperture diameter at the wide-angle end can realize a large lens aperture diameter at the wide-angle end.

At the telephoto end, the aperture stop SP can be narrowed to a state where its stop blades come close to or into slight contact with the aperture stop side lens surface of the lens group L3p. This can provide a minimum aperture diameter corresponding to, for example, an F-number of 11. This means that the lens group L3p can be moved toward the object side to an optical axis direction position where the stop blades forming the aperture diameter corresponding to the F-number of 11 come close to or into slight contact with the aperture stop side lens surface of the lens group L3p that protrudes through the aperture of the aperture stop SP to the object side further than the aperture stop SP. This makes it possible to sufficiently decrease the distance between the lens groups L2p and L3p.

Moreover, each of the zoom lenses of Embodiments 2 and 3 has a configuration of the negative lens group L2p which causes an off-axis principal ray to propagate toward a center of the aperture of the aperture stop SP. In this case, particularly at the wide-angle end, an amount of refraction of the off-axis principal ray increases, which easily causes off-axis aberration, especially astigmatism. Thus, each of the zoom lenses of Embodiments 2 and 3 has a concave-convex configuration of the lens group L1p, which can suppress increase of the front lens diameter, as well as a normal wide-angle lens. Concave (negative) lenses 21 and 22 and a convex (positive) lens 23 that constitute the lens group L2p are formed so as to have approximately concentric spherical shapes whose centers are located at the center of the aperture of the aperture stop SP in order to suppress generation of the off-axis aberration caused by the refraction of the off-axis principal ray. The concave lenses 21 and 22 respectively have an image side concave surface, and the convex lens 23 has a meniscus shape including an object side convex surface.

A most object side convex lens 31 of the lens group L3p has a convex shape toward the object side in order to prevent generation of the off-axis aberration caused by a large refraction of the off-axis principal ray emerging from the lens group L2p. It is desirable to provide such a convex shape toward the object side to the convex lens 31 in order also to reduce a generation amount of spherical aberration with respect to axial rays divergently emerging from the lens group L2p.

In order to dispose the aperture stop SP on the image side further than the convex lens 31 at the telephoto end, it is necessary to provide a larger curvature (that is, a smaller curvature radius) to the object side (aperture stop side) lens surface of the convex lens 31 of the lens group L3p than that of an image side (aperture stop side) lens surface of the convex lens 23 of the lens group L2p.

[Zoom Lens of Embodiment 5]

The zoom lens of Embodiment 5 is constituted by a lens group L1n having a negative refractive power, a lens group (first lens) L2n having a positive refractive power, an aperture stop SP and a lens group (second lens) L3n having a positive refractive power, which are arranged in order from the object side to the image side. A flare cutting stop SP2 is provided at a most object side position of the lens group L2n.

In zooming from the wide-angle end to the telephoto end, the lens group L1n is once moved toward the image side and then moved toward the object side, and the lens group L2n is moved toward the object side. The aperture stop SP is moved toward the object side, and the lens group L3n is moved toward the image side.

Moreover, in the zooming from the wide-angle end to the telephoto end, a distance between the lens group L1n and the lens group L2n is decreased, a distance between the lens group L2n and the aperture stop SP is decreased, and a distance between the aperture stop SP and the lens group L3n is increased.

The zoom lens of Embodiment 5 moves the positive lens group L2n and the positive lens group L3n to perform variation of magnification. Moreover, the zoom lens of Embodiment 5 reciprocates the negative lens group L1n so as to draw a movement track convex toward the image side to compensate image plane variation caused due to the variation of magnification.

In addition, the zoom lens of Embodiment 5 is a rear focus zoom lens that moves the lens group L3n in the optical axis direction to perform focusing.

A solid curved line 3a and a dotted curved line 3b added to the lens group L3n in the figure respectively show movement tracks thereof for compensating the image plane variation caused due to the variation of magnification in the infinitely far distance in-focus state and in the close distance in-focus state.

Moreover, at the telephoto end, when performing focusing from an infinitely far distance side to a close distance side, the zoom lens of Embodiment 5 moves the lens group L3n toward the object side as shown by an arrow 3c.

In the zoom lens of Embodiment 5, the aperture stop SP is movable in the optical axis direction independently of the respective lens groups L1n to L3n in zooming. The aperture stop SP is located on the image side further than a most image side lens surface, that is, an aperture stop side lens surface of the lens group L2n at the wide-angle end, and is located on the object side further than the aperture stop side lens surface of the lens group L2n at the telephoto end. This configuration enables a sufficient decrease of the distance between the lens group L2n and the lens group L3n in the focusing from the infinitely far distance side to the close distance side, which makes it possible to focus on a closer distance object at the telephoto end.

Moreover, in the zoom lens of Embodiment 5, the aperture stop SP is located on the image side further than the aperture stop side lens surface of the lens group L2n at the wide-angle end, and is located on the object side further than the aperture stop side lens surface of the lens group L2n at the telephoto end. This configuration is effective for increasing the lens aperture diameter at the wide-angle end, for cutting flare formed by an upper ray of off-axis rays at the wide-angle end and for cutting flare formed by a lower ray of the off-axis rays at the telephoto end.

If intending to increase the lens aperture diameter at the wide-angle end in a state where the aperture stop SP is located on the image side further than the aperture stop side lens surface of the lens group L2n, a position enabling cutting of the upper ray of the off-axis rays is decided according to a position deciding axial rays. Distancing the aperture stop SP from the aperture stop side lens surface of the lens group L2n to some extent makes it possible to cut the upper ray of the off-axis rays, and thereby makes it possible to bring the aperture stop SP close to the exit pupil.

On the other hand, disposing the aperture stop SP to a position not so far away from the aperture stop side lens surface of the lens group L2n makes it impossible to cut the upper ray of the off-axis rays, but makes it possible to bring the aperture stop SP far away from the exit pupil. Accordingly, at the wide-angle end, in consideration of the off-axis rays and the position of the exit pupil, it is desirable to arrange the aperture stop SP and the aperture stop side lens surface of the lens group L2n away from each other to some extent.

Moreover, at the telephoto end, disposing the aperture stop SP away from the lens group L2n furthers entrance of the lower ray of the off-axis rays into the aperture stop SP. Thus, it is desirable to dispose the aperture stop SP close to the lens group L2n.

In addition, the aperture diameter of the aperture stop SP is varied so as to reduce from the wide-angle end toward the telephoto end. A large aperture diameter at the wide-angle end can realize a large lens aperture diameter at the wide-angle end.

At the telephoto end, the aperture stop SP can be narrowed to a state where its stop blades come close to or into slight contact with the aperture stop side lens surface of the lens group L2n. This can provide a minimum aperture diameter corresponding to, for example, an F-number of 11. This means that the lens group L2n can be brought in close to the aperture stop SP on the image side such that the stop blades forming the aperture diameter corresponding to the F-number of 11 come close to or into slight contact with the aperture stop side lens surface of the lens group L2n that protrudes through the aperture of the aperture stop SP to the image side further than the aperture stop SP. This makes it possible to sufficiently decrease the distance between the lens groups L2n and L3n.

Moreover, the zoom lens of Embodiment 5 has a configuration of the negative lens group L1n which causes an off-axis principal ray to propagate toward a center of the aperture of the aperture stop SP. In this case, particularly at the wide-angle end, an amount of refraction of the off-axis principal ray increases, which easily causes off-axis aberration, especially astigmatism. Thus, the zoom lens of Embodiment 5 has a concave-convex configuration of the lens group L1n, which can suppress increase of the front lens diameter, as well as a normal wide-angle lens. A concave (negative) lens 11 and a convex (positive) lens 12 that constitute the lens group L1n are formed so as to have approximately concentric spherical shapes whose centers are located at the center of the aperture of the aperture stop SP in order to suppress generation of the off-axis aberration caused by the refraction of the off-axis principal ray. The concave lens 11 has an image side concave surface, and the convex lens 12 has a meniscus shape including an object side convex surface.

A most object side convex lens 21 of the lens group L2n has a convex shape toward the object side in order to prevent generation of the off-axis aberration caused by a large refraction of the off-axis principal ray emerging from the lens group L1n. It is desirable to provide such a convex shape toward the object side to the convex lens 21 in order also to reduce a generation amount of spherical aberration with respect to axial rays divergently emerging from the lens group L1n.

The zoom lens of each of Embodiments 1-5 is desirable to satisfy at least one of the following conditions (1)-(4).

In the following conditions, in the second state (the telephoto state shown in FIGS. 12 and 13 and the state shown in FIGS. 14 and 15), X represents a distance in the optical axis direction between the vertex (shown by b1 in FIG. 14 and a1 in FIG. 15) of the aperture stop side surface of the first lens and the C plane including the aperture of the aperture stop SP and being orthogonal to the optical axis. Moreover, L represents a distance in the optical axis direction between the outer edge (shown by b3 in FIGS. 14 and a3 in FIG. 15) of the aperture stop side surface of the first lens and the vertex of the aperture stop side surface of the first lens.

Furthermore, DW represents a distance in the optical axis direction between the vertex of the aperture stop side surface of the first lens and the C plane in the first state (the wide-angle state shown in FIGS. 12 and 13), and DT represents a distance in the optical axis direction between the vertex of the aperture stop side surface of the first lens and the C plane in the second state. The distances DW and DT have a positive (plus) sign in a direction from the first lens side (one side) toward the second lens side (another side) in the optical axis direction.

In addition, $\phi W$ represents an aperture diameter of the aperture stop SP in the first state, and $\phi T$ represents an aperture diameter of the aperture stop SP in the second state. DDT represents a distance in the optical axis direction between the first lens and the second lens at the telephoto end, and fT represents a focal length of an entire system of the zoom lens (lens apparatus) at the telephoto end.

$$0 < X/L < 1.0 \quad (1)$$

$$-250.0 < DW/DT < -1.0 \quad (2)$$

$$1.0 < \phi W/\phi T < 2.0 \quad (3)$$

$$0.0 < DDT/fT < 1.0 \quad (4)$$

If a value of X/L exceeds the upper limit of the condition (1), the aperture stop SP is disposed on the lens edge surface and thereby cannot function as an aperture stop for adjusting light quantity, which is undesirable. Moreover, in such a case, the aperture stop SP cannot be physically placed because of interference with other mechanical structures in the zoom lens. If the value of X/L falls below the lower limit of the condition (1), it becomes impossible to decrease the distance between the first and second lenses, which undesirably makes it difficult to miniaturize the zoom lens and increase the focal length thereof.

If a value of DW/DT falls below the lower limit of the condition (2) to increase in a negative (minus) range, though the positional variation of the exit pupil from the wide-angel end to the telephoto end is sufficiently suppressed, the distance between the aperture stop SP and the second lens at the wide-angle end is excessively increased and thereby axial rays entering the second lens is increased, which undesirably makes it difficult to correct the spherical aberration. Moreover, it becomes necessary to increase a number of lenses to correct the spherical aberration, which increases in size of the zoom lens. If the value of DW/DT exceeds the upper limit of the condition (2) to reduce in the negative range, the positional variation of the exit pupil is increased, and a distance from the front lens to the aperture stop SP at the wide-angle end is increased, which undesirably increases a diameter of the front lens.

If a value of $\phi W/\phi T$ exceeds the upper limit of the condition (3), the aperture diameter of the aperture stop SP at the wide-angle end is increased and thereby the axial rays entering the second lens is increased, which undesirably makes it difficult to correct the spherical aberration. Moreover, it is necessary to increase the number of lenses in order to correct the spherical aberration, which increases in size of the zoom lens. In addition, since the aperture diameter is reduced at the telephoto end, an amount of the aperture stop side lens surface of the first lens entering the aperture of the aperture stop SP is reduced. This undesirably makes it difficult to decrease the distance between the first and second lenses. If the value of $\phi W/\phi T$ falls below the lower limit of the condition (3), the axial rays excessively enter the aperture of the aperture stop at the telephoto end, which undesirably makes it difficult to correct the spherical aberration. In addition, diameters of lenses disposed on the image side further than the aperture stop SP are excessively increased, which undesirably makes it difficult to decrease in size of the zoom lens. Furthermore, the aperture diameter of the aperture stop SP at the wide-angle end is excessively reduced, and thereby increase of the lens aperture diameter cannot be realized.

If a value of DDT/fT exceeds the upper limit of the condition (4), the distance between the first and second lenses is excessively increased, which undesirably increases the entire zoom lens length. If the value of DDT/fT falls below the lower limit of the condition (4), the distance between the first and second lenses is excessively decreased, which undesirably makes it easy to bring the lens surfaces into contact with each other.

It is more desirable to set the numerical ranges of the conditions (1)-(4) as follows:

$$0.005 < X/L < 0.8 \quad (1a)$$

$$-200.0 < DW/DT < -1.2 \quad (2a)$$

$$1.05 < \phi W/\phi T < 1.80 \quad (3a)$$

$$0.0 < DDT/fT < 0.08 \quad (4a).$$

It is still more desirable to set the numerical ranges of the conditions (1)-(4) as follows:

$$0.01 < X/L < 0.6 \quad (1b)$$

$$-197.0 < DW/DT < -1.40 \quad (2b)$$

$$1.07 < \phi W/\phi T < 1.60 \quad (3b)$$

$$0.0 < DDT/fT < 0.06 \quad (4b).$$

Next, Numerical Examples 1-5 respectively corresponding to Embodiments 1-5 are shown. In each numerical example, i represents a surface number counted from the object side, ri represents a curvature radius (mm) of an i-th surface, and di represents a lens thickness or a distance in air (mm) between the i-th surface and an (i+1)-th surface. ni and vi respectively represent a refractive index and an Abbe constant (Abbe number) of a lens material for a d-line.

In each numerical example, two most image side surfaces correspond to an entrance surface and an exit surface of the glass block G.

Moreover, K, A4, A6, A8 and A10 are aspheric coefficients where "e±m" means "×10$^{±m}$". An aspheric shape is expressed as follows where x represents an optical axis direction displacement amount with respect to a surface vertex at a height of h from the optical axis, and r represents a curvature radius:

$$x=(h^2/r)/[1+\{1-(1+K)(h/r)^2\}^{1/2}]+A4h^4+A6h^6+A8h^8+A10h^{10}.$$

The values of the conditions (1)-(4) in Numerical Examples 1-5 (NE1-NE5) are collectively shown in Table 1.

NUMERICAL EXAMPLE 1

Figure 2:
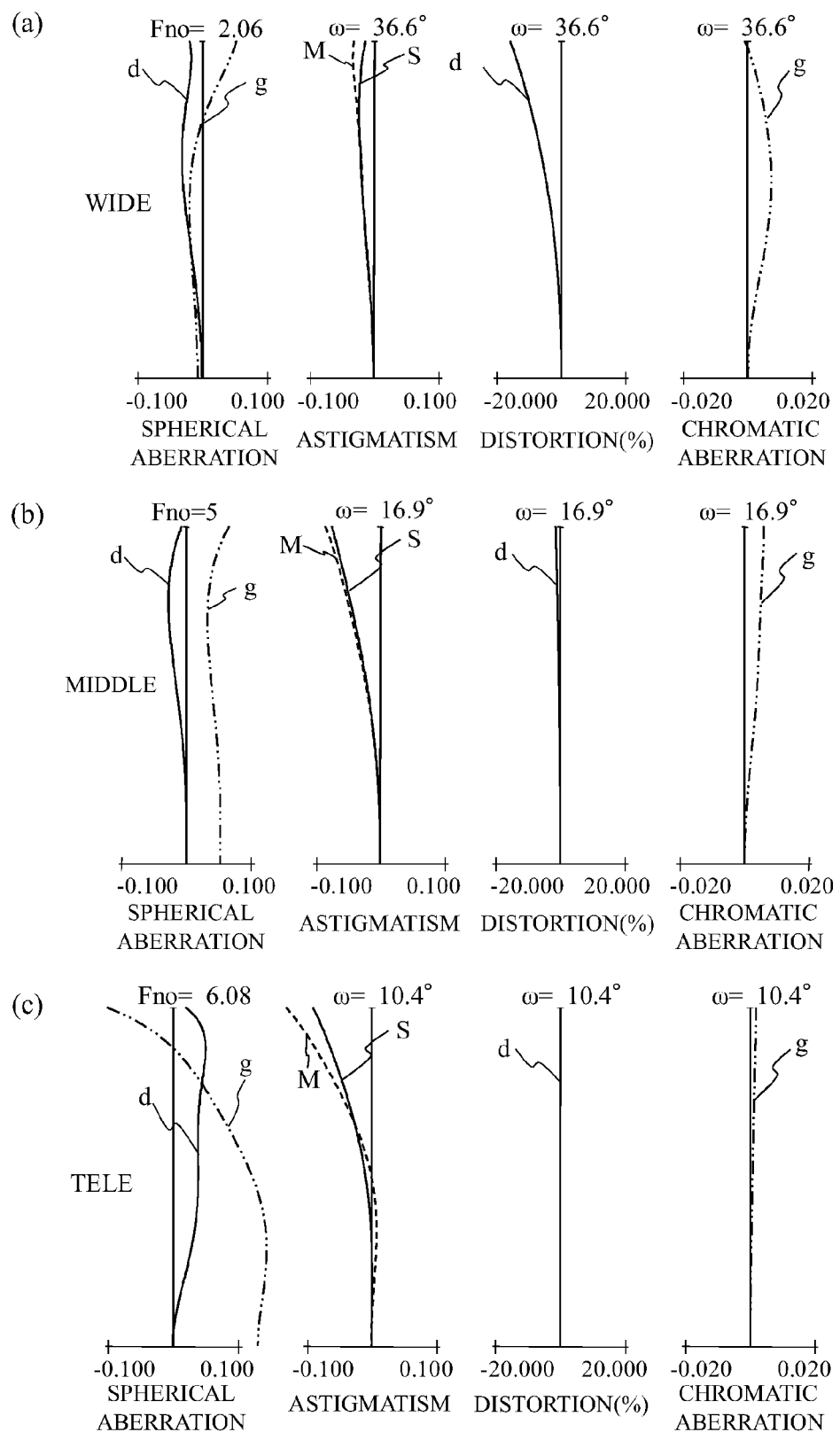
FIG. 2 is aberration charts of Numerical Example 1 at a wide-angle end, a middle zoom position and a telephoto end.

Numerical Example 1 shows a zoom lens corresponding to Embodiment 1, and having a magnification ratio of about 4.7 times and an aperture ratio of about 2.1-6.1. FIG. 2 shows aberration charts of Numerical Example 1 at the wide-angle end, a middle zoom position and the telephoto end. In the aberration chart, d represents spherical aberration and distortion for the d-line, and g represents spherical aberration and chromatic aberration for a g-line. Moreover, S represents astigmatism in a sagittal image plane, and M represents astigmatism in a meridional image plane.

SURFACE DATA

| SURFACE NO. | r | d | nd | vd |
|---|---|---|---|---|
| 1* | 10240.325 | 0.90 | 1.84954 | 40.1 |
| 2* | 6.228 | 2.99 | | |
| 3 | 13.713 | 1.75 | 1.92286 | 18.9 |
| 4 | 34.779 | (VARIABLE) | | |
| 5 (APERTURE STOP) | ∞ | (VARIABLE) | | |
| 6* | 7.354 | 2.50 | 1.74330 | 49.3 |
| 7* | 328.278 | 0.20 | | |
| 8 | 5.806 | 1.86 | 1.45860 | 90.2 |
| 9 | 27.018 | 1.01 | 2.00330 | 28.3 |
| 10 | 3.938 | 1.03 | | |
| 11 | 11.099 | 1.70 | 1.69350 | 53.2 |
| 12* | −30.368 | (VARIABLE) | | |
| 13 | 19.685 | 1.70 | 1.69680 | 55.5 |
| 14 | −1559.414 | (VARIABLE) | | |
| 15 | ∞ | 1.05 | 1.51633 | 64.1 |
| 16 | ∞ | (VARIABLE) | | |
| IMAGE PLANE | ∞ | | | |

ASPHERIC DATA

1ST SURFACE

K = −7.54512e+008    A4 = −1.68880e−004
A6 = 3.88233e−006    A8 = −4.33771e−008
A10 = 1.82770e−010

2ND SURFACE

K = −2.03052e+000    A4 = 4.27922e−004
A6 = −4.17442e−006    A8 = 1.23794e−007
A10 = −1.62488e−009

6TH SURFACE

K = −4.08747e−001    A4 = −4.73185e−005
A6 = −1.46451e−006

7TH SURFACE

K = 4.06530e+002    A4 = 1.60052e−005
A6 = −1.50489e−007

12TH SURFACE

K = 8.99077e+001    A4 = 1.37437e−004
A6 = −1.36274e−005

VARIOUS DATA
ZOOM RATIO 4.71

| | WIDE | MIDDLE | TELE |
|---|---|---|---|
| FOCAL LENGTH | 5.36 | 15.28 | 25.21 |
| F-NUMBER | 2.06 | 5.00 | 6.08 |
| ANGLE OF VIEW | 36.61 | 16.85 | 10.40 |
| IMAGE HEIGHT | 3.98 | 4.63 | 4.63 |
| ENTIRE LENS LENGTH | 44.33 | 41.81 | 50.90 |
| BACK FOCUS | 0.50 | 0.50 | 0.50 |
| EXIT PUPIL POSITION | −20.72 | −109.04 | 149.80 |
| d 4 | 18.78 | 4.29 | 1.41 |
| d 5 | 0.30 | 0.05 | −0.20 |
| d12 | 4.51 | 16.73 | 28.95 |
| d14 | 3.55 | 3.55 | 3.55 |
| d16 | 0.50 | 0.50 | 0.50 |

LENS GROUP DATA

| GROUP | START SURFACE | FOCAL LENGTH(mm) |
|---|---|---|
| 1 | 1 | −12.51 |
| 2 | 5 | ∞ |
| 3 | 6 | 12.24 |
| 4 | 13 | 27.91 |
| 5 | 15 | ∞ |

NUMERICAL EXAMPLE 2

Figure 4:
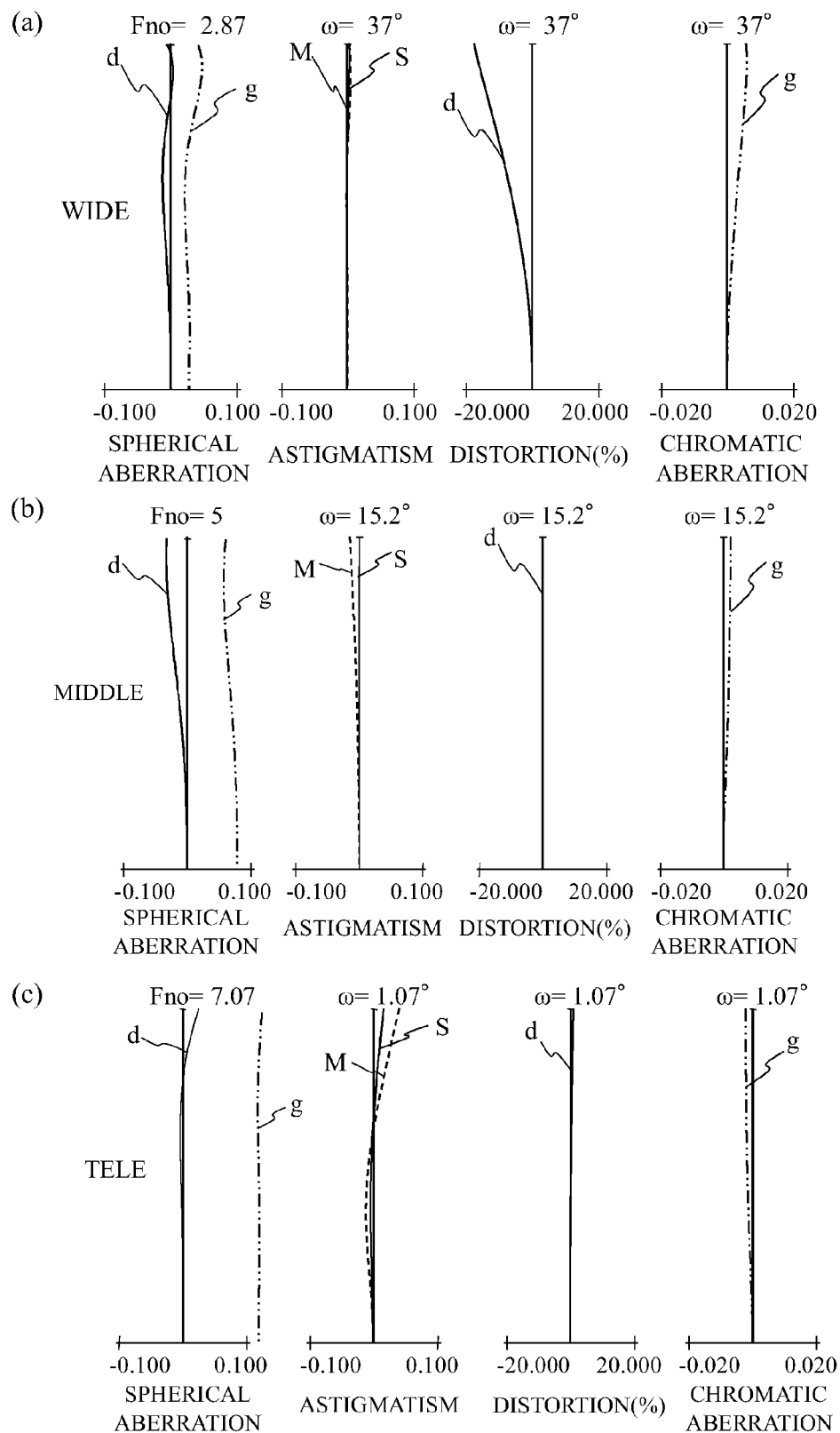
FIG. 4 is aberration charts of Numerical Example 2 at a wide-angle end, a middle zoom position and a telephoto end.

Numerical Example 2 shows a zoom lens corresponding to Embodiment 2, and having a magnification ratio of about 47.0 times and an aperture ratio of about 2.9-7.1. FIG. 4 shows aberration charts of Numerical Example 2 at the wide-angle end, a middle zoom position and the telephoto end.

SURFACE DATA

| SURFACE NO. | r | d | nd | vd |
|---|---|---|---|---|
| 1 | 105.237 | 1.80 | 1.80610 | 33.3 |
| 2 | 52.259 | 5.00 | 1.45860 | 90.2 |
| 3 | −181.110 | 0.18 | | |
| 4 | 45.218 | 3.05 | 1.59282 | 68.6 |
| 5 | 140.680 | (VARIABLE) | | |
| 6 | 233.514 | 0.95 | 1.88300 | 40.8 |
| 7 | 8.692 | 4.85 | | |
| 8 | −34.059 | 0.70 | 1.77250 | 49.6 |
| 9 | 26.599 | 0.20 | | |
| 10 | 16.879 | 2.35 | 1.92286 | 18.9 |
| 11 | 100.234 | (VARIABLE) | | |
| 12 (APERTURE STOP) | ∞ | (VARIABLE) | | |
| 13* | 10.061 | 3.65 | 1.55332 | 71.7 |
| 14* | −71.895 | 1.51 | | |
| 15 | 34.668 | 0.60 | 1.64769 | 33.8 |
| 16 | 10.601 | 0.38 | | |
| 17 | 15.564 | 0.60 | 1.80400 | 46.6 |
| 18 | 8.388 | 2.55 | 1.48749 | 70.2 |
| 19 | −35.536 | (VARIABLE) | | |
| 20 | 49.646 | 0.70 | 1.48749 | 70.2 |
| 21 | 22.030 | (VARIABLE) | | |
| 22 | 23.615 | 2.30 | 1.80610 | 33.3 |
| 23 | −28.707 | 0.60 | 1.94595 | 18.0 |
| 24 | −765.407 | (VARIABLE) | | |
| 25 | ∞ | 0.80 | 1.51633 | 64.1 |
| 26 | ∞ | (VARIABLE) | | |
| IMAGE PLANE | ∞ | | | |

ASPHERIC DATA

13TH SURFACE

K = −9.46687e−001    A4 = 1.53081e−005
A6 = −3.34170e−007    A8 = −3.17984e−008
A10 = 2.62605e−010

-continued

14TH SURFACE

K = 1.48852e+002    A4 = 6.03868e−005
A6 = −1.87760e−007

VARIOUS DATA
ZOOM RATIO 47.05

|  | WIDE | MIDDLE | TELE |
|---|---|---|---|
| FOCAL LENGTH | 4.42 | 14.24 | 208.00 |
| F-NUMBER | 2.87 | 5.00 | 7.07 |
| ANGLE OF VIEW | 37.01 | 15.23 | 1.07 |
| IMAGE HEIGHT | 3.33 | 3.88 | 3.88 |
| ENTIRE LENS LENGTH | 95.29 | 94.62 | 138.53 |
| BACK FOCUS | 0.50 | 0.50 | 0.50 |
| EXIT PUPIL POSITION | −115.97 | −51.11 | 194.03 |
| d 5 | 0.78 | 18.03 | 62.00 |
| d11 | 34.65 | 14.04 | 1.01 |
| d12 | 9.74 | 1.89 | −0.50 |
| d19 | 2.69 | 2.58 | 6.78 |
| d21 | 4.29 | 5.45 | 27.49 |
| d24 | 9.88 | 19.36 | 8.49 |
| d26 | 0.50 | 0.50 | 0.50 |

LENS GROUP DATA

| GROUP | START SURFACE | FOCAL LENGTH(mm) |
|---|---|---|
| 1 | 1 | 80.07 |
| 2 | 6 | −9.49 |
| 3 | 12 | ∞ |
| 4 | 13 | 19.85 |
| 5 | 20 | −81.92 |
| 6 | 22 | 32.63 |
| 7 | 25 | ∞ |

NUMERICAL EXAMPLE 3

Figure 6:
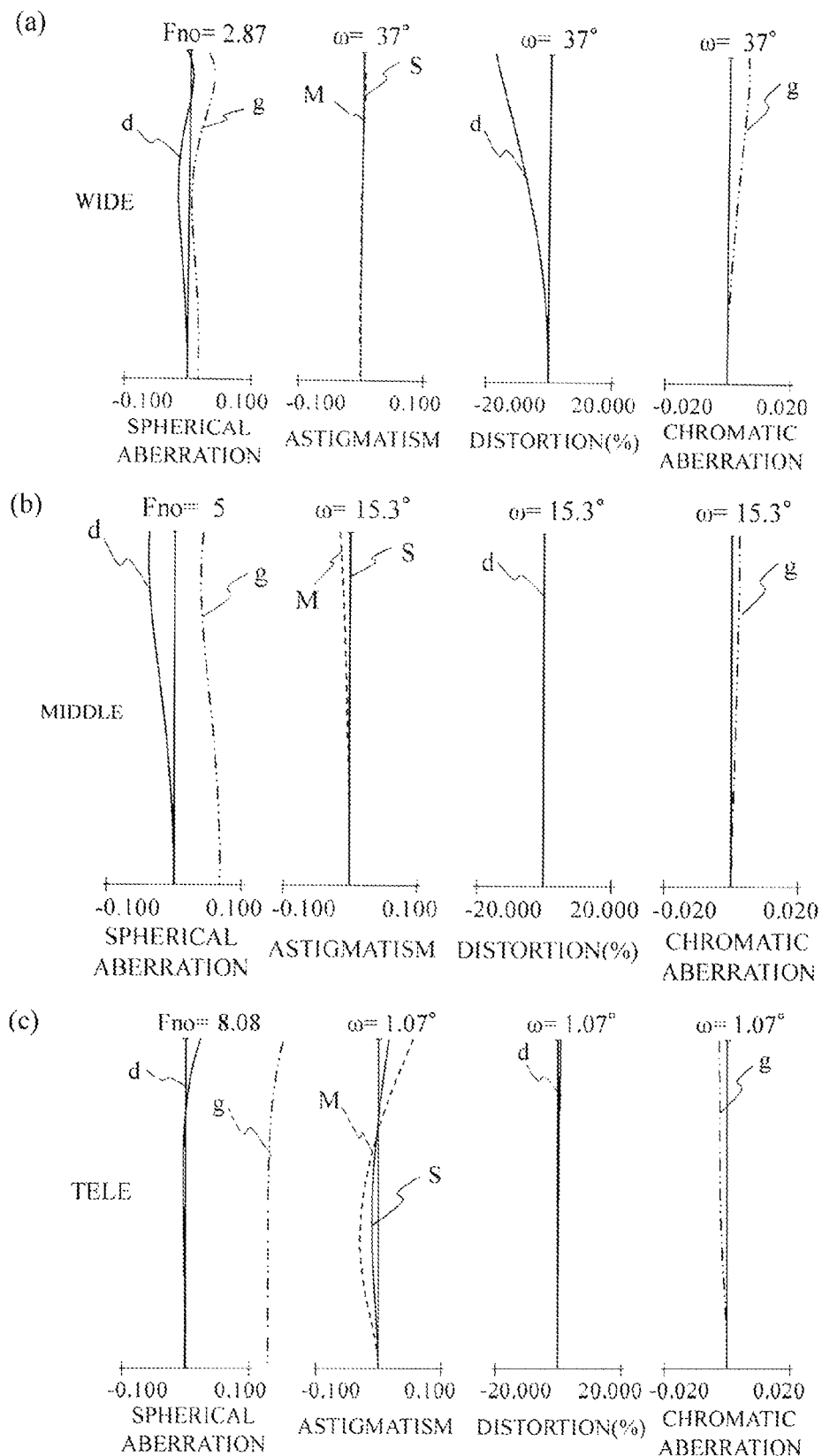
FIG. 6 is aberration charts of Numerical Example 3 at a wide-angle end, a middle zoom position and a telephoto end.

Numerical Example 3 shows a zoom lens corresponding to Embodiment 3, and having a magnification ratio of about 47.0 times and an aperture ratio of about 2.9-8.1. FIG. 6 shows aberration charts of Numerical Example 3 at the wide-angle end, a middle zoom position and the telephoto end.

SURFACE DATA

| SURFACE NO. | r | d | nd | vd |
|---|---|---|---|---|
| 1 | 105.315 | 1.80 | 1.80610 | 33.3 |
| 2 | 52.281 | 4.96 | 1.45860 | 90.2 |
| 3 | −179.758 | 0.18 | | |
| 4 | 45.282 | 3.03 | 1.59282 | 68.6 |
| 5 | 140.542 | (VARIABLE) | | |
| 6 | 257.486 | 0.95 | 1.88300 | 40.8 |
| 7 | 8.736 | 4.81 | | |
| 8 | −34.227 | 0.70 | 1.77250 | 49.6 |
| 9 | 26.439 | 0.20 | | |
| 10 | 16.882 | 2.24 | 1.92286 | 18.9 |
| 11 | 99.502 | (VARIABLE) | | |
| 12 (APERTURE STOP) | ∞ | (VARIABLE) | | |
| 13* | 10.061 | 3.09 | 1.55332 | 71.7 |
| 14* | −71.895 | 2.11 | | |
| 15 | 35.243 | 0.60 | 1.64769 | 33.8 |
| 16 | 10.745 | 0.39 | | |
| 17 | 16.117 | 0.60 | 1.80400 | 46.6 |
| 18 | 8.202 | 2.68 | 1.48749 | 70.2 |
| 19 | −33.931 | (VARIABLE) | | |
| 20 | 128.779 | 0.70 | 1.48749 | 70.2 |
| 21 | 32.325 | (VARIABLE) | | |
| 22 | 23.992 | 2.29 | 1.80610 | 33.3 |
| 23 | −29.278 | 0.60 | 1.94595 | 18.0 |
| 24 | −629.042 | (VARIABLE) | | |
| 25 | ∞ | 0.80 | 1.51633 | 64.1 |
| 26 | ∞ | (VARIABLE) | | |
| IMAGE PLANE | ∞ | | | |

ASPHERIC DATA

13TH SURFACE

K = −8.89575e−001    A4 = 2.05979e−005
A6 = −1.05915e−006    A8 = −3.45753e−008
A10 = 2.62605e−010

14TH SURFACE

K = 1.41738e+002    A4 = 7.10234e−005
A6 = −1.18052e−006

VARIOUS DATA
ZOOM RATIO 47.07

|  | WIDE | MIDDLE | TELE |
|---|---|---|---|
| FOCAL LENGTH | 4.42 | 14.15 | 208.02 |
| F-NUMBER | 2.87 | 5.00 | 8.08 |
| ANGLE OF VIEW | 37.02 | 15.31 | 1.07 |
| IMAGE HEIGHT | 3.33 | 3.88 | 3.88 |
| ENTIRE LENS LENGTH | 95.31 | 94.60 | 138.54 |
| BACK FOCUS | 0.50 | 0.50 | 0.50 |
| EXIT PUPIL POSITION | −112.81 | −51.26 | 194.66 |
| d 5 | 0.78 | 17.96 | 62.11 |
| d11 | 34.97 | 14.32 | 0.94 |
| d12 | 9.78 | 2.01 | −0.05 |
| d19 | 2.49 | 2.50 | 6.87 |
| d21 | 3.97 | 5.09 | 26.95 |
| d24 | 10.10 | 19.50 | 8.50 |
| d26 | 0.50 | 0.50 | 0.50 |

LENS GROUP DATA

| GROUP | START SURFACE | FOCAL LENGTH(mm) |
|---|---|---|
| 1 | 1 | 80.12 |
| 2 | 6 | −9.49 |
| 3 | 12 | ∞ |
| 4 | 13 | 20.14 |
| 5 | 20 | −88.74 |
| 6 | 22 | 32.84 |
| 7 | 25 | ∞ |

NUMERICAL EXAMPLE 4

Figure 8:
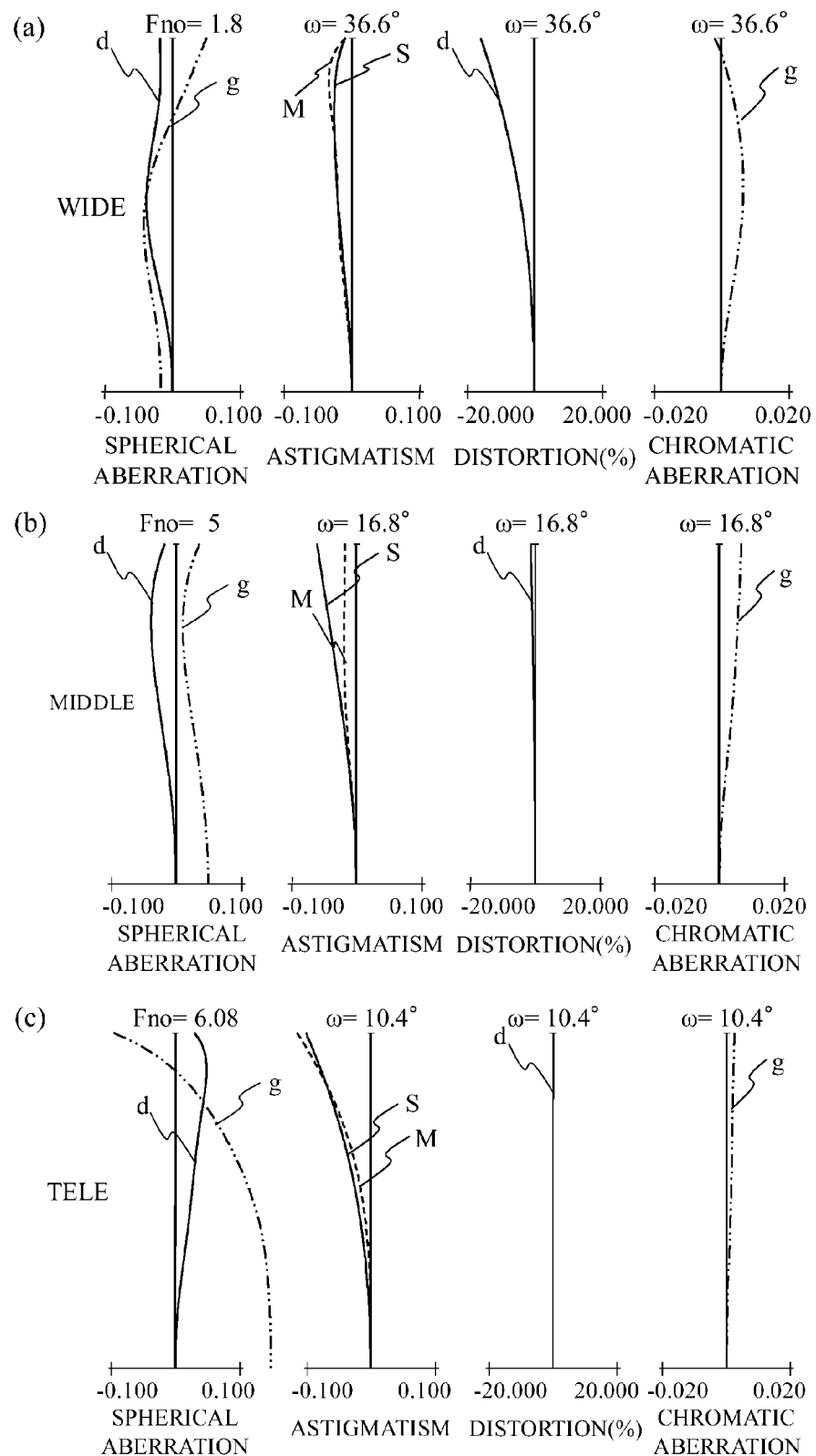
FIG. 8 is aberration charts of Numerical Example 4 at a wide-angle end, a middle zoom position and a telephoto end.

Numerical Example 4 shows a zoom lens corresponding to Embodiment 4, and having a magnification ratio of about 4.7 times and an aperture ratio of about 1.8-6.1. FIG. 8 shows aberration charts of Numerical Example 4 at the wide-angle end, a middle zoom position and the telephoto end.

SURFACE DATA

| SURFACE NO. | r | d | nd | vd |
|---|---|---|---|---|
| 1* | ∞ | 0.90 | 1.84954 | 40.1 |
| 2* | 6.466 | 3.05 | | |
| 3 | 13.812 | 1.75 | 1.92286 | 18.9 |
| 4 | 32.567 | (VARIABLE) | | |
| 5 (APERTURE STOP) | ∞ | (VARIABLE) | | |
| 6* | 7.326 | 2.50 | 1.74330 | 49.3 |
| 7* | 12926.791 | 0.20 | | |
| 8 | 5.590 | 2.05 | 1.45860 | 90.2 |
| 9 | 23.950 | 0.50 | 2.00330 | 28.3 |
| 10 | 4.043 | 1.25 | | |
| 11 | 12.841 | 1.70 | 1.69350 | 53.2 |
| 12* | −41.318 | (VARIABLE) | | |
| 13 | 21.428 | 1.70 | 1.69680 | 55.5 |

-continued

| | | | | |
|---|---|---|---|---|
| 14 | −291.759 | (VARIABLE) | | |
| 15 | ∞ | 1.05 | 1.51633 | 64.1 |
| 16 | ∞ | (VARIABLE) | | |
| IMAGE PLANE | ∞ | | | |

ASPHERIC DATA

1ST SURFACE

K = −7.54512e+008     A4 = −1.57884e−004
A6 = 3.99990e−006     A8 = −4.60508e−008
A10 = 1.91636e−010

2ND SURFACE

K = −2.11313e+000     A4 = 4.29499e−004
A6 = −3.53813e−006    A8 = 1.22486e−007
A10 = −1.73905e−009

6TH SURFACE

K = −2.92940e−001     A4 = −5.00720e−005
A6 = −2.09230e−006

7TH SURFACE

K = 8.11282e+006      A4 = 6.57682e−005
A6 = −9.86821e−007

12TH SURFACE

K = 1.54107e+002      A4 = −6.97739e−005
A6 = −1.03987e−005

VARIOUS DATA
ZOOM RATIO 4.71

| | WIDE | MIDDLE | TELE |
|---|---|---|---|
| FOCAL LENGTH | 5.36 | 15.30 | 25.24 |
| F-NUMBER | 1.80 | 5.00 | 6.08 |
| ANGLE OF VIEW | 36.60 | 16.83 | 10.39 |
| IMAGE HEIGHT | 3.98 | 4.63 | 4.63 |
| ENTIRE LENS LENGTH | 45.40 | 42.08 | 50.90 |
| BACK FOCUS | 0.50 | 0.50 | 0.50 |
| EXIT PUPIL POSITION | −32.10 | −138.17 | 179.35 |
| d 4 | 16.13 | 2.82 | 1.65 |
| d 5 | 4.00 | 1.90 | −0.20 |
| d12 | 4.57 | 16.66 | 28.75 |
| d14 | 3.55 | 3.55 | 3.55 |
| d16 | 0.50 | 0.50 | 0.50 |

LENS GROUP DATA

| GROUP | START SURFACE | FOCAL LENGTH(mm) |
|---|---|---|
| 1 | 1 | −12.74 |
| 2 | 5 | ∞ |
| 3 | 6 | 12.44 |
| 4 | 13 | 28.71 |
| 5 | 15 | ∞ |

NUMERICAL EXAMPLE 5

Figure 10:
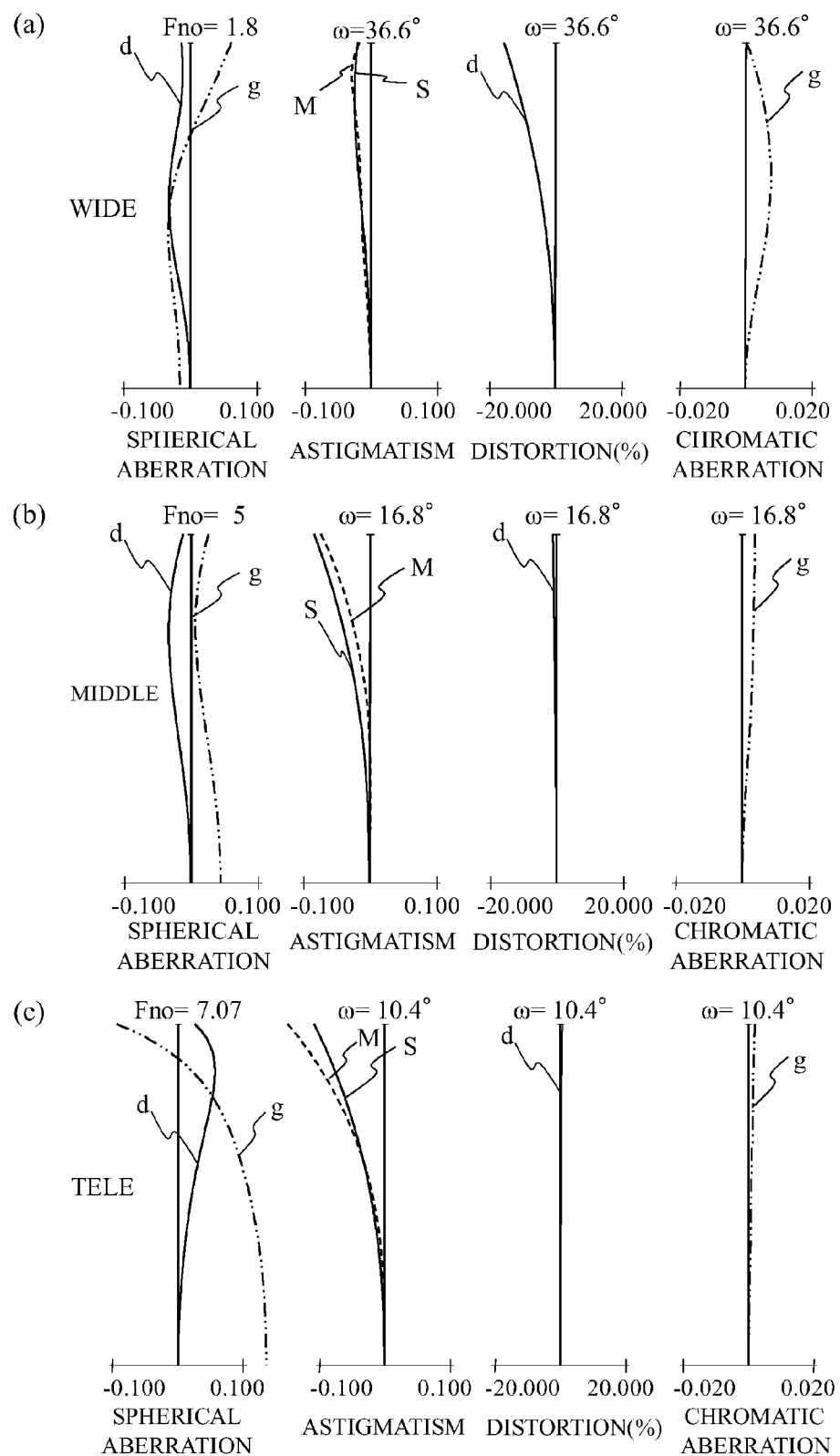
FIG. 10 is aberration charts of Numerical Example 5 at a wide-angle end, a middle zoom position and a telephoto end.

Numerical Example 5 shows a zoom lens corresponding to Embodiment 5, and having a magnification ratio of about 4.7 times and an aperture ratio of about 1.8-7.1. FIG. 10 shows aberration charts of Numerical Example 5 at the wide-angle end, a middle zoom position and the telephoto end.

SURFACE DATA

| SURFACE NO. | r | d | nd | vd |
|---|---|---|---|---|
| 1* | 19712.592 | 0.90 | 1.84954 | 40.1 |
| 2* | 6.198 | 3.12 | | |
| 3 | 13.653 | 1.75 | 1.92286 | 18.9 |
| 4 | 32.321 | (VARIABLE) | | |
| 5 | ∞ | (VARIABLE) | | |
| (APERTURE STOP 2) | | | | |
| 6* | 7.421 | 2.50 | 1.74330 | 49.3 |
| 7* | 21506.640 | 0.20 | | |
| 8 | 5.528 | 2.20 | 1.45860 | 90.2 |
| 9 | 29.152 | 0.50 | 2.00330 | 28.3 |
| 10 | 4.076 | 1.36 | | |
| 11 | 12.158 | 1.70 | 1.69350 | 53.2 |
| 12* | −40.155 | (VARIABLE) | | |
| 13 | ∞ | (VARIABLE) | | |
| (APERTURE STOP) | | | | |
| 14 | 18.733 | 1.70 | 1.69680 | 55.5 |
| 15 | 1382.499 | (VARIABLE) | | |
| 16 | ∞ | 1.05 | 1.51633 | 64.1 |
| 17 | ∞ | (VARIABLE) | | |
| IMAGE PLANE | ∞ | | | |

ASPHERIC DATA

1ST SURFACE

K = −7.54512e+008     A4 = −2.00199e−004
A6 = 4.38478e−006     A8 = −4.09465e−008
A10 = 1.23737e−010

2ND SURFACE

K = −2.01838e+000     A4 = 4.15123e−004
A6 = −5.93056e−006    A8 = 2.17447e−007
A10 = −2.68209e−009

6TH SURFACE

K = −3.37014e−001     A4 = −3.29573e−005
A6 = −8.25253e−007

7TH SURFACE

K = 2.17850e+007      A4 = 6.09128e−005
A6 = −4.64292e−007

12TH SURFACE

K = 1.51515e+002      A4 = 1.78466e−005
A6 = 4.71363e−006

VARIOUS DATA
ZOOM RATIO 4.71

| | WIDE | MIDDLE | TELE |
|---|---|---|---|
| FOCAL LENGTH | 5.35 | 15.30 | 25.24 |
| F-NUMBER | 1.80 | 5.00 | 7.07 |
| ANGLE OF VIEW | 36.63 | 16.83 | 10.39 |
| IMAGE HEIGHT | 3.98 | 4.63 | 4.63 |
| ENTIRE LENS LENGTH | 44.97 | 42.06 | 50.90 |
| BACK FOCUS | 0.50 | 0.50 | 0.50 |
| EXIT PUPIL POSITION | −9.78 | −50.96 | 17.48 |
| d 4 | 19.07 | 4.41 | 1.50 |
| d 5 | 0.30 | 0.05 | −0.20 |
| d12 | 1.02 | 0.48 | −0.05 |
| d13 | 4.70 | 17.24 | 29.77 |
| d15 | 2.40 | 2.40 | 2.40 |
| d17 | 0.50 | 0.50 | 0.50 |

LENS GROUP DATA

| GROUP | START SURFACE | FOCAL LENGTH(mm) |
|---|---|---|
| 1 | 1 | −12.14 |
| 2 | 5 | ∞ |
| 3 | 6 | 12.18 |
| 4 | 13 | ∞ |
| 5 | 14 | 27.24 |
| 6 | 16 | ∞ |

FOCUS MOVEMENT AMOUNT TO OBJECT SIDE AT TELEPHOTO END (14 mm FROM FRONT LENS) 28.47 mm

TABLE 1

| CONDITION | (1)~(4) LOWER LIMIT | (1)~(4) UPPER LIMIT | (1a)~(4a) LOWER LIMIT | (1a)~(4a) UPPER LIMIT | (1b)~(4b) LOWER LIMIT | (1b)~(4b) UPPER LIMIT | NE1 | NE2 | NE3 | NE4 | NE5 |
|---|---|---|---|---|---|---|---|---|---|---|---|
| \|X\|/\|L\| | 0.00 | 1.00 | 0.005 | 0.80 | 0.01 | 0.60 | 0.14 | 0.56 | 0.04 | 0.09 | 0.02 |
| X | | | | | | | 0.20 | 0.50 | 0.05 | 0.20 | −0.05 |
| L | | | | | | | 1.437 | 0.891 | 1.333 | 2.111 | 2.600 |
| DW/DT | −250.00 | −1.00 | −200.00 | −1.20 | −197.00 | −1.40 | −1.500 | −19.482 | −195.577 | −20.042 | −1.499 |
| DW | | | | | | | 0.300 | 9.741 | 9.779 | 4.000 | 0.300 |
| DT | | | | | | | −0.200 | −0.500 | −0.050 | −0.200 | −0.200 |
| φW/φT | 1.00 | 2.00 | 1.05 | 1.80 | 1.07 | 1.60 | 1.171 | 1.076 | 1.266 | 1.2258 | 1.569 |
| φW | | | | | | | 7.717 | 6.863 | 6.941 | 8.109 | 8.970 |
| φT | | | | | | | 6.588 | 6.377 | 5.484 | 6.615 | 5.716 |
| DDT/fT | 0.00 | 1.00 | 0.00 | 0.08 | 0.00 | 0.06 | 0.048 | 0.002 | 0.004 | 0.057 | 0.045 |
| DDT | | | | | | | 1.208 | 0.414 | 0.886 | 1.448 | 1.130 |
| fT | | | | | | | 25.21 | 208.00 | 208.02 | 25.24 | 25.24 |

Next, description will be made of a digital camera (image pickup apparatus) provided with an image-taking optical system constituted by the zoom lens that is any one of the zoom lenses described in Embodiments 1-5, with reference to FIG. 11.

Figure 11:
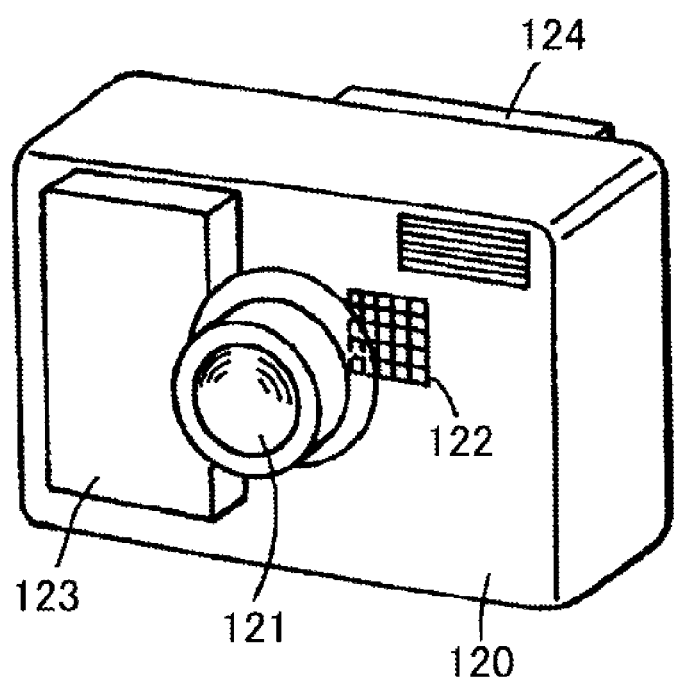
FIG. 11 shows the configuration of an image pickup apparatus provided with the lens apparatus of any one of Embodiments 1 to 5.

In FIG. 11, reference numeral 120 denotes a camera body, and reference numeral 121 denotes an image-taking optical system constituted by the zoom lens described in any one of Embodiments 1-5.

Reference numeral 122 denotes an image sensor such as a CCD sensor or a CMOS sensor, which photoelectrically converts an object image formed by the image-taking optical system 121. Reference numeral 123 denotes a recording medium that records image data generated on the basis of output signals from the image sensor 122. Reference numeral 124 denotes an electronic viewfinder to cause a user to observe images displayed on a display device (not shown).

As described above, providing the zoom lens described in each of Embodiments 1-5 to the image pickup apparatus, such as a digital camera, enables realization of high optical performance while being small in size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-185184, filed on Aug. 20, 2010, which is hereby incorporated by reference herein in its entirety.

What is claimed is:

1. A lens apparatus comprising:
   an aperture stop forming an aperture;
   a first lens disposed on a first side further than the aperture stop in a direction of an optical axis of the lens apparatus, the first side being one of an object side and an image side; and
   a second lens disposed on a second side further than the aperture stop in the direction of the optical axis, the second side being the other of the object side and the image side,
   wherein, in zooming or focusing, the aperture stop is moved independently of the first and second lenses in the direction of the optical axis, and
      the first lens and the aperture stop are brought into a first state where an aperture stop side lens surface of the first lens is located away from the aperture stop on the first side and a second state where at least part of the aperture stop side lens surface of the first lens protrudes through the aperture to the second side further than the aperture stop.

2. A lens apparatus according to claim 1,
   wherein, in focusing between a close distance in-focus state and an infinitely far distance in-focus state, the first lens and the aperture stop are brought into one of the first and second states at the close distance in-focus state and into the other of the first and second states at the infinitely far distance in-focus state.

3. A lens apparatus according to claim 1,
   wherein, when a plane including the aperture and being orthogonal to the optical axis is defined as an aperture plane, the following condition is satisfied:

$$-250.0 < DW/DT < -1.0$$

where DW represents a distance in the direction of the optical axis between a vertex of the aperture stop side lens surface of the first lens and the aperture plane in the first state, and DT represents a distance in the direction of the optical axis between the vertex of the aperture stop side lens surface of the first lens and the aperture plane in the second state.

4. A lens apparatus according to claim 1,
   wherein the aperture stop is a variable aperture stop in which a diameter of the aperture is variable.

5. A lens apparatus according to claim 1,
   wherein an aperture stop side lens surface of the second lens is a convex surface.

6. A lens apparatus according to claim 1,
   wherein, in zooming between a wide-angle state and a telephoto state, the first lens and the aperture stop are brought into one of the first and second states at the wide-angle state and into the other of the first and second states at the telephoto state.

7. A lens apparatus according to claim 6,
   wherein the first lens and the aperture stop are brought into the first state at the wide-angle state and into the second state at the telephoto state, and
   wherein the following condition is satisfied:

$$0.0 < DDT/fT < 1.0$$

where DDT represents a distance on the optical axis between the first lens and the second lens at the telephoto state, and fT represents a focal length of an entire system of the lens apparatus at the telephoto state.

8. A lens apparatus according to claim 6,
   wherein the first lens and the aperture stop are brought into the first state at the wide-angle state and into the second state at the telephoto state, wherein the aperture stop is a variable aperture stop in which a diameter of the aperture is variable, and wherein the diameter of the aperture in the second state is smaller than that in the first state.

9. A lens apparatus according to claim 8, wherein the following condition is satisfied:

$$1.0 < \phi W/\phi T < 2.0$$

where $\phi W$ represents the diameter of the aperture in the first state, and $\phi T$ represents the diameter of the aperture in the second state.

10. An image pickup apparatus comprising:

a lens apparatus comprising an aperture stop forming an aperture, a first lens disposed on a first side further than the aperture stop in a direction of an optical axis of the lens apparatus, the first side being one of an object side and an image side, and a second lens disposed on a second side further than the aperture stop in the direction of the optical axis, the second side being the other of the object side and the image side, wherein, in zooming or focusing, the aperture stop is moved independently of the first and second lenses in the direction of the optical axis, and wherein the first lens and the aperture stop are brought into a first state where an aperture stop side lens surface of the first lens is located away from the aperture stop on the first side and a second state where at least part of the aperture stop side lens surface of the first lens protrudes through the aperture to the second side further than the aperture stop; and an image pickup element configured to photoelectrically convert an optical image formed by the lens apparatus.

* * * * *